United States Patent
Simmons et al.

(10) Patent No.: US 12,496,664 B2
(45) Date of Patent: Dec. 16, 2025

(54) METHOD AND APPARATUS FOR PRECISION MANUFACTURING OF MOMENT CONNECTION ASSEMBLIES

(71) Applicant: ConXtech, Inc., Pleasanton, CA (US)

(72) Inventors: Maxwell C. Simmons, Hayward, CA (US); John S. Boyd, Tiburon, CA (US); Kevin Marek, Hayward, CA (US); Eric Bellman, Hayward, CA (US); Robert J. Simmons, Hayward, CA (US)

(73) Assignee: ConXtech, Inc., Pleasanton, CA (US)

( * ) Notice: Subject to any disclaimer, the term of this patent is extended or adjusted under 35 U.S.C. 154(b) by 0 days.

(21) Appl. No.: 18/366,646

(22) Filed: Aug. 7, 2023

(65) Prior Publication Data

US 2024/0075562 A1    Mar. 7, 2024

Related U.S. Application Data

(63) Continuation of application No. 17/353,486, filed on Jun. 21, 2021, now Pat. No. 11,717,921, which is a
(Continued)

(51) Int. Cl.
    *B23K 37/0533*      (2025.01)
    *B23K 37/04*      (2006.01)
    (Continued)

(52) U.S. Cl.
    CPC ...... *B23K 37/0533* (2013.01); *B23K 37/0536* (2013.01); *B23Q 1/527* (2013.01);
    (Continued)

(58) Field of Classification Search
    CPC ............ B23K 37/0533; B23K 37/0538; B23K 37/0408; B23K 37/0443; B23K 37/0452;
    (Continued)

(56) References Cited

U.S. PATENT DOCUMENTS

| | | |
|---|---|---|
| 1,232,024 A | 7/1917 | Garland et al. |
| 2,411,629 A | 11/1946 | Lane |
| | (Continued) | |

FOREIGN PATENT DOCUMENTS

| | | |
|---|---|---|
| CN | 1863636 A | 11/2006 |
| CN | 1973096 A | 5/2007 |
| | (Continued) | |

OTHER PUBLICATIONS

U.S. Receiving Office of WIPO, International Search Report regarding PCT Patent Application No. PCT/US04/29238, dated Oct. 12, 2006, 1 page.
(Continued)

*Primary Examiner* — Tyrone V Hall, Jr.
(74) *Attorney, Agent, or Firm* — Kolisch Hartwell, P.C.

(57) ABSTRACT

An apparatus for connecting collar components to an elongate member is disclosed. The apparatus includes a frame structure having a central opening that is configured to receive an elongate member and that includes at least a first gripping station and a second gripping station. Each gripping station includes a reference surface and a clamp device that is configured to force a collar component against the reference surface. The first and second gripping stations are configured to control relative spatial location of a first collar component held by the first gripping station relative to a second collar component gripped by the second gripping station, prior to connecting the first and second collar components to the elongate member.

19 Claims, 11 Drawing Sheets

Related U.S. Application Data continuation of application No. 16/186,539, filed on Nov. 10, 2018, now Pat. No. 11,040,419.

(60) Provisional application No. 62/628,864, filed on Feb. 9, 2018, provisional application No. 62/584,796, filed on Nov. 11, 2017.

(51) Int. Cl.
*B23K 37/0536* (2025.01)
*B23K 37/0538* (2025.01)
*B23Q 1/52* (2006.01)
*B23K 101/06* (2006.01)

(52) U.S. Cl.
CPC ...... *B23K 37/0426* (2013.01); *B23K 37/0443* (2013.01); *B23K 37/0538* (2013.01); *B23K 2101/06* (2018.08)

(58) Field of Classification Search
CPC . B23K 37/0426; B23K 37/0536; B23Q 1/527
See application file for complete search history.

(56) References Cited

U.S. PATENT DOCUMENTS

| | | | |
|---|---|---|---|
| 2,513,037 A | 6/1950 | McLaughlin | |
| 2,641,829 A | 6/1953 | Sasso | |
| 2,768,597 A * | 10/1956 | Smith | B23K 37/0452 |
| | | | 228/6.1 |
| 3,085,148 A | 4/1963 | McConnell | |
| 3,090,237 A * | 5/1963 | Ongaro | G01M 1/22 |
| | | | 82/162 |
| 3,319,691 A | 5/1967 | Fisher | |
| 3,521,875 A | 7/1970 | Kapelsohn | |
| 3,629,931 A | 12/1971 | Stanley | |
| 3,653,115 A | 4/1972 | Perkins | |
| 3,824,661 A | 7/1974 | Dobson et al. | |
| 3,845,538 A | 11/1974 | Demler, Sr. | |
| 3,845,930 A | 11/1974 | Metrailer | |
| 3,877,129 A | 4/1975 | Dobson et al. | |
| 3,940,105 A | 2/1976 | Metrailer | |
| 4,131,048 A | 12/1978 | Dickes | |
| 4,480,383 A | 11/1984 | Yoshioka et al. | |
| 4,494,431 A | 1/1985 | Niswonger | |
| 4,584,918 A | 4/1986 | Stubbe et al. | |
| 4,629,408 A | 12/1986 | Giron et al. | |
| 4,653,968 A * | 3/1987 | Rapata | F16B 39/30 |
| | | | 248/188.4 |
| 4,893,393 A | 1/1990 | Marshall | |
| 5,112,183 A | 5/1992 | Nusbaum et al. | |
| 5,206,980 A | 5/1993 | Chapman | |
| 5,289,665 A | 3/1994 | Higgins | |
| 5,337,875 A * | 8/1994 | Lee | B65G 13/12 |
| | | | 193/35 C |
| 5,355,576 A | 10/1994 | Miller | |
| 5,727,778 A | 3/1998 | Nodar | |
| 5,975,512 A | 11/1999 | Lin | |
| RE36,541 E | 2/2000 | Rossi | |
| 6,322,061 B1 | 11/2001 | Maser et al. | |
| 6,367,788 B1 | 4/2002 | Babchuk | |
| H2061 H | 4/2003 | Tunnell | |
| 6,554,366 B2 | 4/2003 | Zeeuw et al. | |
| 6,773,200 B2 | 8/2004 | Cole | |
| 6,837,016 B2 | 1/2005 | Simmons et al. | |
| 7,036,202 B2 | 5/2006 | Lorenz | |
| 7,076,852 B2 | 7/2006 | Penman et al. | |
| 7,127,863 B2 | 10/2006 | Simmons | |
| 7,621,099 B2 * | 11/2009 | Simmons | B23K 31/12 |
| | | | 403/177 |
| 7,716,820 B2 | 5/2010 | Simmons | |
| 7,837,084 B2 | 11/2010 | Simmons | |
| 7,908,725 B1 | 3/2011 | Irish et al. | |
| 7,941,985 B2 | 5/2011 | Simmons | |
| 8,205,312 B2 | 6/2012 | Simmons | |
| 9,334,642 B1 | 5/2016 | Tanaka et al. | |
| 2002/0083607 A1 | 7/2002 | Atsuhiko et al. | |
| 2002/0153406 A1 | 10/2002 | Vermaat | |
| 2003/0041549 A1 | 3/2003 | Simmons et al. | |
| 2004/0139683 A1 | 7/2004 | Simmons | |
| 2005/0055954 A1 | 3/2005 | Simmons | |
| 2006/0163317 A1 | 7/2006 | Wirth | |
| 2008/0106018 A1 * | 5/2008 | Bellavance | B23K 37/0533 |
| | | | 269/57 |
| 2008/0245021 A1 | 10/2008 | Simmons | |
| 2010/0171254 A1 | 7/2010 | Rolle | |
| 2010/0192346 A1 | 8/2010 | Simmons | |
| 2012/0213937 A1 | 8/2012 | LaValley et al. | |
| 2012/0279949 A1 | 11/2012 | Simmons | |
| 2014/0033491 A1 | 2/2014 | Donaldson et al. | |
| 2017/0182604 A1 * | 6/2017 | Velez | F16M 11/42 |

FOREIGN PATENT DOCUMENTS

| | | | | |
|---|---|---|---|---|
| CN | 10216144 | A | 8/2011 | |
| CN | 104014954 | A * | 9/2014 | B23K 37/0276 |
| CN | 104070321 | A | 10/2014 | |
| CN | 104874971 | A | 9/2015 | |
| CN | 106239020 | A | 12/2016 | |
| CN | 205852152 | U | 1/2017 | |
| EP | 1668197 | B1 | 10/2009 | |
| EP | 3162976 | A1 | 5/2017 | |
| FR | 1514258 | A | 2/1968 | |
| JP | H06081394 | A | 3/1994 | |
| JP | H07150635 | A | 6/1995 | |
| JP | H08144370 | A | 6/1996 | |
| JP | 2003253758 | A | 9/2003 | |
| JP | 2004011377 | A | 1/2004 | |
| WO | 2005028762 | A2 | 3/2005 | |

OTHER PUBLICATIONS

European Patent Office, Supplemental European Search Report regarding European Patent Application No. 04783476.7, dated Aug. 6, 2007, 1 page.

U.S. Patent and Trademark Office, Non-Final Office Action regarding U.S. Appl. No. 10/938,909, dated Jun. 2, 2008, 9 pages.

U.S. Patent and Trademark Office, Non-Final Office Action regarding U.S. Appl. No. 10/938,909, dated Jul. 11, 2008, 9 pages.

U.S. Patent and Trademark Office, Final Office Action regarding U.S. Appl. No. 10/938,909, dated Nov. 26, 2008, 12 pages.

U.S. Patent and Trademark Office, Non-Final Office Action regarding U.S. Appl. No. 10/938,909, dated May 8, 2009, 8 pages.

U.S. Patent and Trademark Office, Non-Final Office Action regarding U.S. Appl. No. 12/080,863, dated Jul. 8, 2009, 9 pages.

U.S. Patent and Trademark Office, Non-Final Office Action regarding U.S. Appl. No. 12/798,183, dated Jun. 27, 2011, 11 pages.

U.S. Patent and Trademark Office, Final Office Action regarding U.S. Appl. No. 12/798,183, dated Jan. 3, 2012, 6 pages.

European Patent Office, Extended European Search Report regarding European Patent Application No. 08767946.0, dated Jan. 17, 2014, 7 pages.

European Patent Office, Extended European Search Report regarding European Patent Application No. 16189759.0, dated Apr. 5, 2017, 9 pages.

U.S. Receiving Office of WIPO, International Search Report and Written Opinion of the International Searching Authority regarding PCT Patent Application No. PCT/US18/60230, dated Mar. 14, 2019, 13 pages.

The International Bureau of WIPO, International Preliminary Report on Patentability regarding PCT Patent Application No. PCT/US2018/60230, dated May 12, 2020, 7 pages.

China National Intellectual Property Administration, First Office Action regarding Chinese Patent Application No. 201880085774.5, dated Jul. 30, 2021, 6 pages.

(56) References Cited

OTHER PUBLICATIONS

European Patent Office, Supplementary European Search Report regarding European Patent Application No. PCT/US2018060230, dated Jul. 30, 2021, 6 pages.

* cited by examiner

METHOD AND APPARATUS FOR PRECISION MANUFACTURING OF MOMENT CONNECTION ASSEMBLIES

CROSS-REFERENCES

This application is a continuation of U.S. patent application Ser. No. 17/353,486 filed Jun. 21, 2021, which is a continuation of U.S. patent application Ser. No. 16/186,539 filed Nov. 10, 2018, which claims priority from U.S. Provisional Patent Application Ser. No. 62/584,796, filed Nov. 11, 2017, and from U.S. Provisional Patent Application Ser. No. 62/628,864, filed Feb. 9, 2018, the entireties of which are hereby incorporated by reference for all purposes. The following related applications and materials are also incorporated by reference herein, in their entireties, for all purposes: U.S. Pat. Nos. 7,621,099 and 7,941,985.

INTRODUCTION

Full moment collar beam mounts offer a valuable improvement over on-site welding techniques for steel frame building construction. Welding can be done off site in controlled conditions, and connected beam mounts seat frame members in proper spatial orientation at a construction site.

U.S. Pat. No. 7,941,985 discloses an exemplary full moment collar beam mount, described as a halo/spider connection. A collar corner assembly is welded to each of the four corners of the column. At each face of the column, a flange sub-assembly of an upper flange and a lower flange connected by a web insert is received in a tapered channel formed between the collar corner assemblies at the adjacent corners. Where a beam and a column connect, the flange sub-assembly is welded to the end of the beam. Connections across all faces of the column together form a full moment collar.

The beam connections allow precise building frame construction, but also require precise manufacturing. Along the length of a building frame, many beam and column connections line up and tolerances or imprecisions from the connections may be added or multiplied. This can result in undesirable overall deviation from specifications. Manufacturing tools and methods are needed to facilitate precise positioning and welding of beam connection components in the manufacturing process.

An important part of a manufacturing process is the welding of collar corners to the corners of a column. The collar corners must be precisely located along the length of the column, and in a correct spatial configuration relative to one another. The column must also be supported through the process, and access to the weld-sites made safely and easily available to workers.

SUMMARY

The present disclosure provides systems, apparatuses, and methods relating to precision manufacturing of moment connection assemblies. In some embodiments, an apparatus for connecting collar components to an elongate member may include a frame structure having a central opening that is configured to receive an elongate member and that includes at least a first gripping station and a second gripping station. Each gripping station may include a reference surface and a clamp device that is configured to force a collar component against the reference surface. The first and second gripping stations may be configured to control relative spatial location of a first collar component held by the first gripping station relative to a second collar component gripped by the second gripping station, prior to connecting the first and second collar components to the elongate member.

In some embodiments, an apparatus for connecting collar components to an elongate member may include a reference frame and a plurality of holding stations. The reference frame may include first and second plate structures connected in parallel by a plurality of struts, and each plate structure may have an opening for receiving a column. Each holding station may be mounted between a pair of the plurality of struts and may include a reference surface and a clamp device. The clamp device may be configured to pull a collar component against the reference surface into a pre-set location relative to other collar components secured at others of the plurality of holding stations.

In some embodiments, a method of connecting a collar component to an elongate member may include a step of securing an elongate member in a support assembly configured to allow rotation of the elongate member around a central axis. The method may further include a step of encompassing the elongate member with a frame structure that includes a plurality of holding stations. Each holding station may have a reference surface and a clamp device configured to force a collar component against the reference surface prior to welding the collar component to the elongate member.

Features, functions, and advantages may be achieved independently in various embodiments of the present disclosure, or may be combined in yet other embodiments, further details of which can be seen with reference to the following description and drawings.

DETAILED DESCRIPTION

Figure 1:
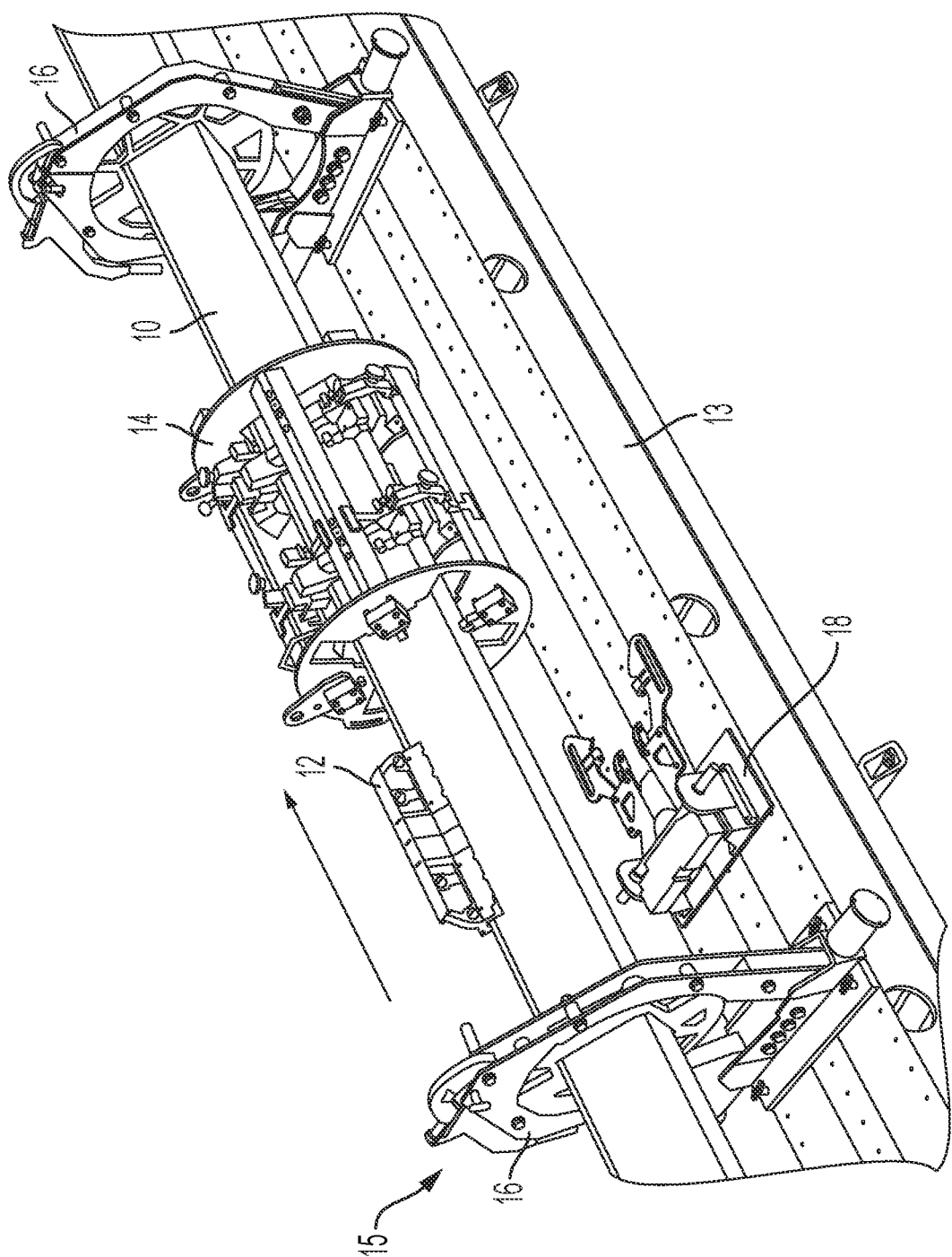
FIG. 1 is an isometric view of an illustrative apparatus for connecting collar components to an elongate member, in accordance with aspects of the present disclosure, with an illustrative collar component and elongate member.

Various aspects and examples of an apparatus for connecting collar components to an elongate member, as well as related methods, are described below and illustrated in the associated drawings. Unless otherwise specified, a apparatus in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, an apparatus or system for connecting collar components to an elongate member may include a support assembly and a weld fixture. The weld fixture may also be described as a jig, a cage, a positioning device, and/or fabrication equipment. The support assembly may be adjustable for use with multiple sizes of elongate member, and the weld fixture may be adjustable for use with multiple sizes of collar components. The support assembly may be used with a weld fixture selected from a set of weld fixtures. This adjustability and interchangeability may facilitate manufacture of collar beam mounts for a variety of both column and beam sizes, without need for separate equipment and without sacrificing precision.

The support assembly may be configured to support the elongate member and facilitate rotation of the elongate member around a central axis. The weld fixture may be configured to receive a portion of the elongate member, and to travel along the elongate member from a first end to a second end. The support assembly may also be operable to allow the weld fixture to travel along the elongate member while the member remains supported.

The weld fixture may be configured to receive multiple collar components, and to hold each collar component against one or more reference surfaces of the weld fixture in order to precisely position the collar components relative to one another. The weld fixture may be configured to maintain the collar components in position adjacent the elongate member while the collar components are connected to the elongate member.

FIG. 1 shows components of an illustrative system, which may also be described as a set of manufacturing equipment. The system is configured for connecting Collar Corner Assemblies (CCAs) 12 to a rectangular column 10. The CCAs form part of a full moment collar beam mount similar to the one disclosed in U.S. Pat. No. 7,941,985. Each of four CCAs is welded to a corner of the column, in preparation to engage four collar flange assemblies to form the collar of the beam mount.

The system includes a weld fixture 14 and a support assembly 15 with multiple rotating clamps 16 and support stands 18 on a track 13. Clamps 16 and stands 18 are alternately spaced along track 13 to support column 10. Stands 18 may receive column with an elongate axis of the column at a first height, and clamps 16 may lift the column such that the elongate axis is at a second height. Once column 10 is supported by clamps 16, stands 18 may be folded down out of the way of the weld fixture. Clamps 16 may each be opened and then re-closed in turn to allow passage of weld fixture 14 along column 10. Clamps 16 may be adjustable to support columns of various sizes and styles, with the elongate axes at the same second height. Similarly, support stands 18 may be adjustable to support columns of various sizes, with the elongate axes at the same first height.

Weld fixture 14 may be used to attach CCAs 12 at multiple nodes along column 10. The weld fixture may be moved along the column from a bottom end of the column, to each node, and finally off the top end of the column. At each node the fixture may be positioned and CCAs may be loaded and secured, then fixed in place. The CCAs may be fixed to the column by tack welding, bonding, and/or any effective method. Once all CCAs for a node are fixed to the column, securing or locating mechanisms may be loosened or removed and the fixture may be slid over the CCAs, up the column to the next node. The weld fixture may include multiple features to improve the precision with which the CCAs are positioned, prior to fixing the CCAs to the column.

Examples, Components, and Alternatives

The following sections describe selected aspects of exemplary apparatus for connecting collar components to an elongate member, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Weld Fixture

As shown in FIGS. 2-7, this section describes an illustrative weld fixture 100. Weld fixture 100 is an example of weld fixture 14, described above. Weld fixture 100 may also be referred to as a Collar Corner Weld Fixture, or a CCWF.

Similarly to weld fixture 14, as shown in FIG. 1, weld fixture 100 includes a frame with two end plates and multiple longitudinal struts. Mounted between the struts are a first and a second simulator assembly.

Figure 2:
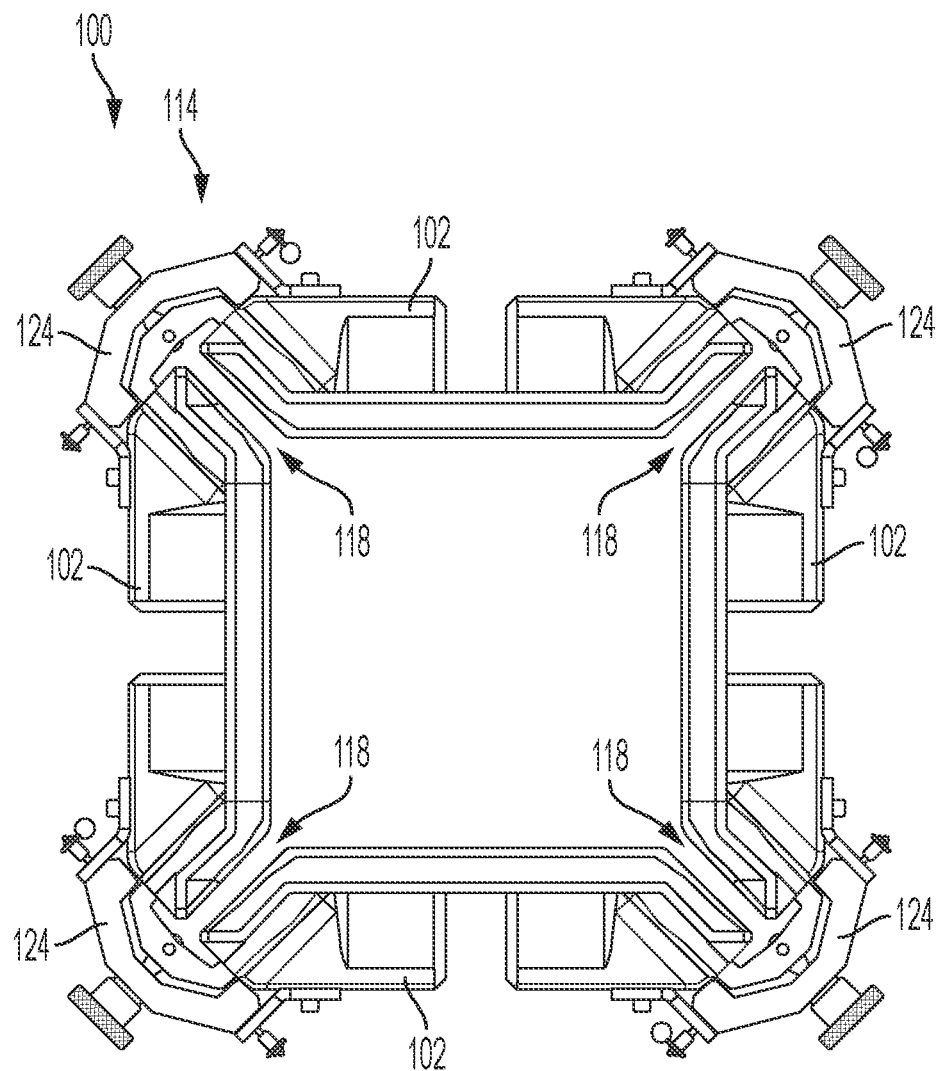
FIG. 2 is an axial view of a simulator assembly of an illustrative weld fixture.

FIG. 2 is an axial view of first simulator assembly 114. Second simulator assembly 116, shown in FIG. 5, matches first simulator assembly 114 in most aspects. The following description of the first simulator assembly can be understood to apply to the second simulator assembly unless otherwise stated.

First simulator assembly 114 includes four flange simulators 102. Each flange simulator has substantially the same geometry as a collar flange that would be included in a collar flange assembly mounted to the end of a beam in a collar beam mount. The flange simulators 102 serve as references to precisely locate a Collar Corner Assembly (CCA) in weld fixture 100, and to correctly locate the CCA relative to one or more other CCAs. Weld fixture 100 may be used to position and/or locate a single CCA, or simultaneously position two, three, or four CCAs. A full collar beam mount may require four CCAs be attached at the appropriate longitudinal location along the column.

First simulator assembly 114 includes four gripping stations 118, which may also be referred to as holding stations. Each gripping station includes a channel formed between a pair of adjacent flange simulators 102, and a screw clamp 124. Each screw clamp 124 is mounted to a pair of adjacent flange simulators 102. In some examples, screw clamps 124 may be additionally and/or alternatively mounted to the weld fixture frame.

Figure 3:
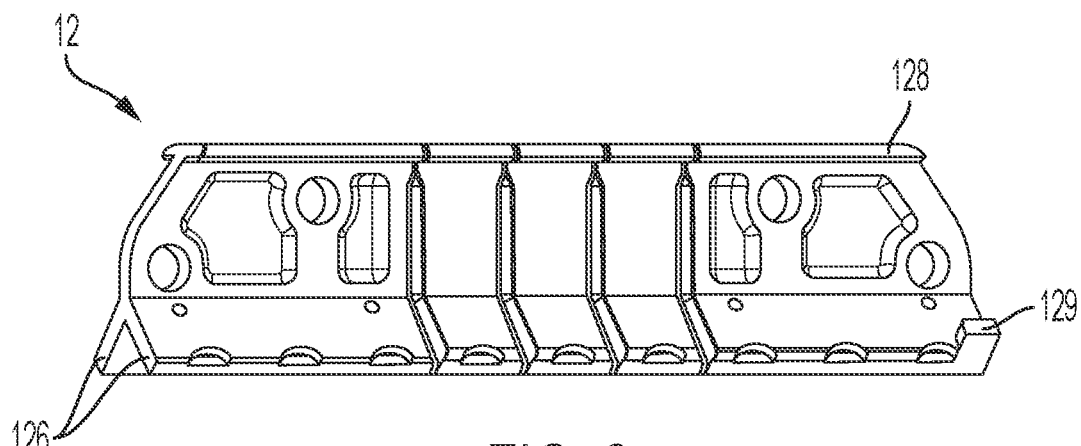
FIG. 3 is an isometric view of an illustrative collar component.

FIG. 3 is an isometric view of an illustrative CCA 12. The depicted CCA includes two feet 126, each having an upper surface and a lower surface, where the lower surfaces are intended for welding to a column. Feet 126 may also be described as a Y-portion of the CCA. CCA 12 further includes a T-portion 128, opposite feet 126. At one end, the CCA includes a trailing protrusion 129 extending from each of feet 126. Trailing protrusions 129 may also be described as vertical, z-axis, or longitudinal stops. In some examples, CCA 12 may include a trailing protrusion 129 on only one of feet 126 or may not include any trailing protrusions.

Figure 4:
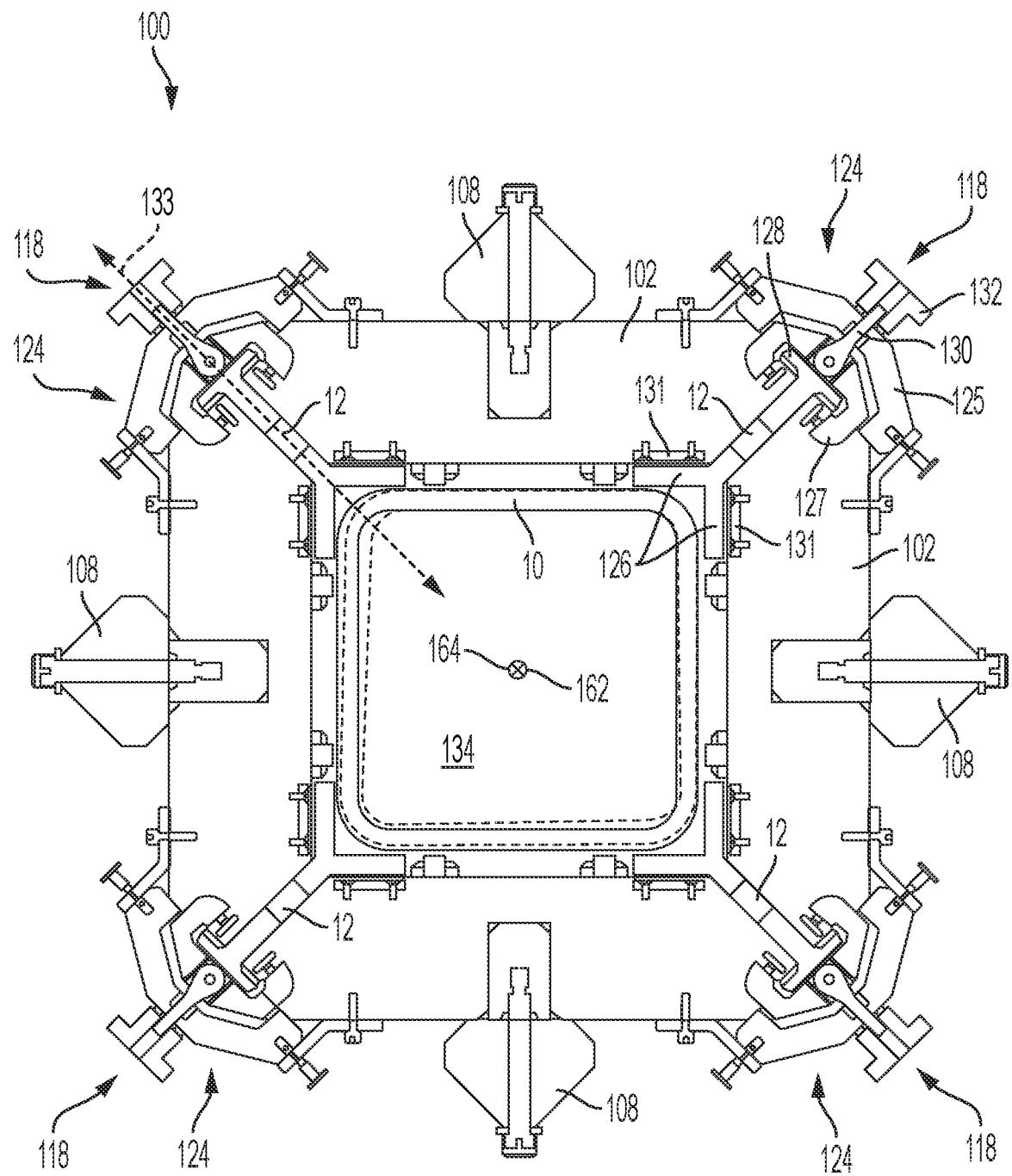
FIG. 4 is a partial cross-sectional view of the weld fixture of FIG. 2 with an illustrative elongate member and collar components.

FIG. 4 is a cross-sectional view of first simulator assembly 114 and four longitudinal struts 108 of the frame of weld fixture 100. Four CCAs 12 and a column 10 are depicted as received in the weld fixture. Each CCA 12 is received in a gripping station 118, with T-portion 128 received in the inner brace of a screw clamp 124 and feet 126 located proximate faces of column 10 on either side of a corner of the column.

Weld fixture 100 includes a central opening 134 which receives column 10. Central opening 134 may define a z-axis, longitudinal axis, or central axis 162 of weld fixture 100. Multiple rollers 136 are mounted along the interior of opening 134, on end plates of the weld fixture frame 104 and on inner surfaces of the flange simulators 102. These rollers 136 may serve to locate the weld fixture 100 relative to the column 10, as well as facilitate movement of the fixture along the column from one beam mount location to another.

Adjusting positions of the rollers 136 may allow central axis 162 to be aligned coincident with the rotational axis, or z-axis 164 of column 10. Adjusting rollers 136 may also allow the weld gaps between the feet 126 of the CCA 12 and the column 10 to be precisely tuned. For instance, feet 126 may be positioned equidistant from corresponding faces of column 10.

Each screw clamp 124 includes an outer brace 125 and an inner brace 127. The inner brace is shaped to conform to T-portion 128 of a CCA 12, with arms extending under the T-portion 128. A threaded member 130 extends through the outer brace 125 from an adjustment knob 132 to the inner brace, such that turning the adjustment knob draws the inner brace 127 toward or away from the outer brace. Such raising and lowering of the inner brace also raises and lower the received CCA.

Each gripping station 118 further includes two reference surfaces 131. Each reference surface is disposed on an inner side of a flange simulator 102, to contact the upper surface of a foot 126 of a CCA 12. First simulator assembly 114 and weld fixture 100 may be constructed and/or configured such that reference surfaces 131 are precisely located and/or positioned relative to one another. Reference surfaces 131 may be machined on flange simulators 102 or otherwise precisely manufactured. In the present example, reference surfaces 131 are separate components fastened to flange simulators 102. Fastening may allow adjustment of the reference surfaces after manufacture and/or assembly. For example, reference surfaces 131 may be re-positioned to a desired level of precision after transport, extended use, and/or exposure to temperature fluctuations.

The upper surfaces of both feet 126 of each CCA may be secured against reference surfaces 131 to precisely locate the CCAs relative to one another. Adjustment knob 132 of each screw clamp 124 may be used to raise inner brace 127 and pull each CCA away from central axis 162. The clamps may be described as pulling each CCA along a radial axis 133 that intersects central axis 162 and a corresponding corner of column 10.

Positioning the CCAs relative to one another rather than relative to column 10 may protect the resulting collar beam mount from imprecisions in column 10. As shown in dashed lines in FIG. 4, some columns may be warped and/or vary in one or more dimensions and/or angles. With the CCAs positioned by weld fixture 100 and the weld fixture aligned with the z-axis of the column, the CCAs can be correctly spaced and oriented irrespective of variations in the column. Weld tolerances may thereby compensate for the column variations. Securing CCAs 12 in such a manner may also mitigate the risk of weld shrinkage.

Figure 5:
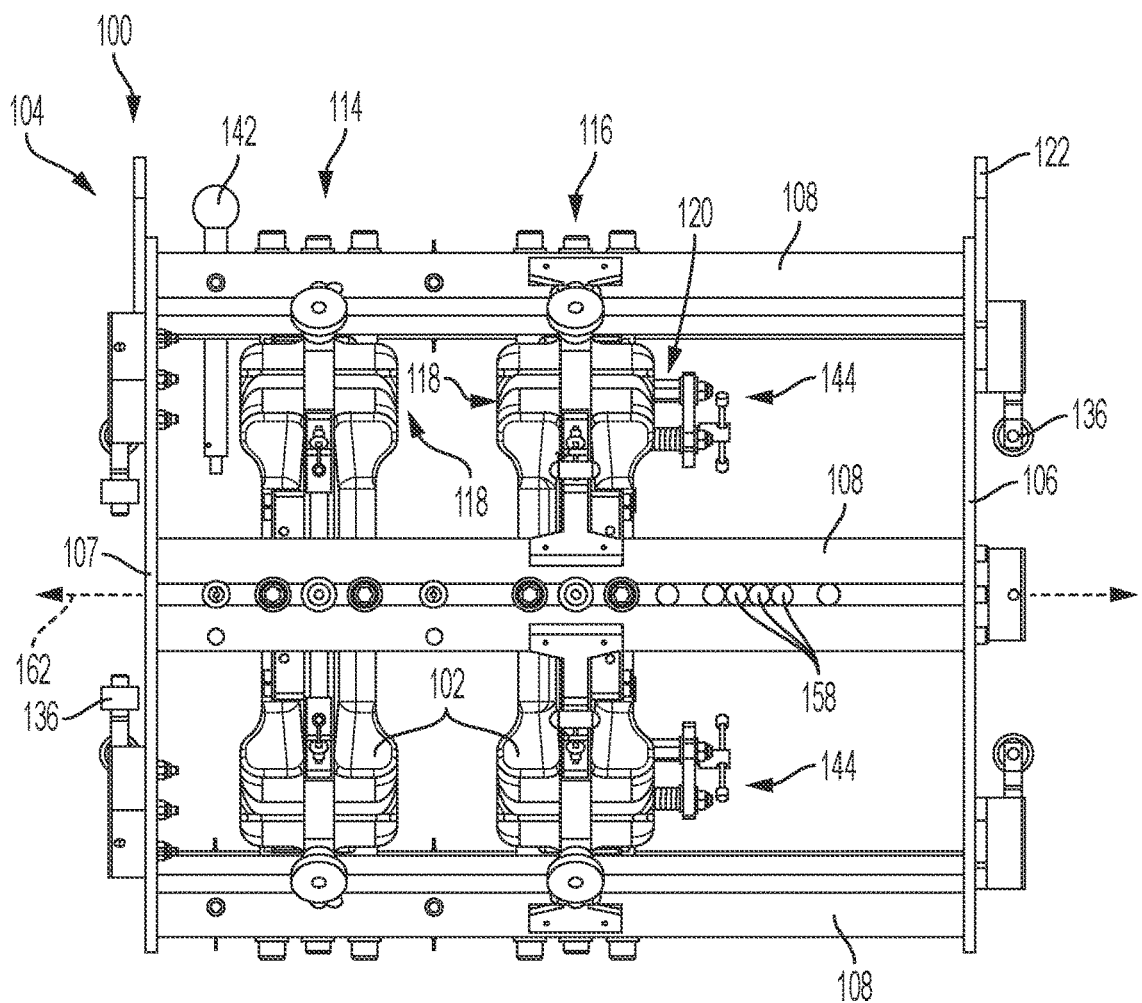
FIG. 5 is a side view of the weld fixture of FIG. 2.

FIG. 5 is a side view of weld fixture 100, including first simulator assembly 114, second simulator assembly 116, and frame 104. The frame includes four longitudinal struts 108, of which 3 are shown, and two end plates 106, 107. The two end plates are parallel to one another, the four struts 108 are mutually parallel, and the struts are perpendicular to the end plates. Frame 104 may include any effective structural members, of any appropriate geometry.

Each gripping station 118 on the first simulator assembly 114, together with the corresponding gripping station on the second simulator assembly 116 forms a loading station 120 for a CCA. Each gripping station 118 of second simulator assembly 116 further includes a gate or latch device 144. A CCA may be loaded into weld fixture 100 by sliding along a corner of the column, through end plate 107, into a loading station 120. The CCA may be secured in the loading station and precisely positioned along central axis 162 of the weld fixture by latch device 144.

Together, the four flange simulators 102 of each of first and second simulator assemblies 114, 116 simulate the relative positioning of upper and lower flanges in a collar beam mount. The two simulator assemblies have a spacing from one another, along the central axis 162 of the weld fixture. This spacing corresponds to a size of the CCA to be received in weld fixture 100, which in turn corresponds to the beam depth of a beam to be used in the collar beam mount.

First simulator assembly 114 is fixed to struts 108 of frame 104, but second simulator assembly 116 is adjustable along the struts. In some examples, both simulator assemblies may adjustable, a length of struts 108 may be adjustable, or weld fixture 100 may include any mechanism appropriate to modify the distance between simulator assemblies. In the depicted example, multiple apertures 158 are provided in struts 108, such second simulator assembly 116 can be bolted to the struts at multiple positions corresponding to selected CCA sizes. Markings indicating the beam depth associated with each CCA size may be included on struts 108 to facilitate quick and easy adjustment. The weld fixture 100 may therefore be used in manufacturing collar beam mounts for multiple beam sizes and may be easily transitioned between configurations for different sizes.

Weld fixture 100 also includes an indexing pin 142. The column may be provided with an indexing hole corresponding to each node or correct location for a beam mount. Slotting the indexing pin 142 of the weld fixture 100 into the indexing hole may locate the weld fixture precisely along the length of the column.

Figure 6:
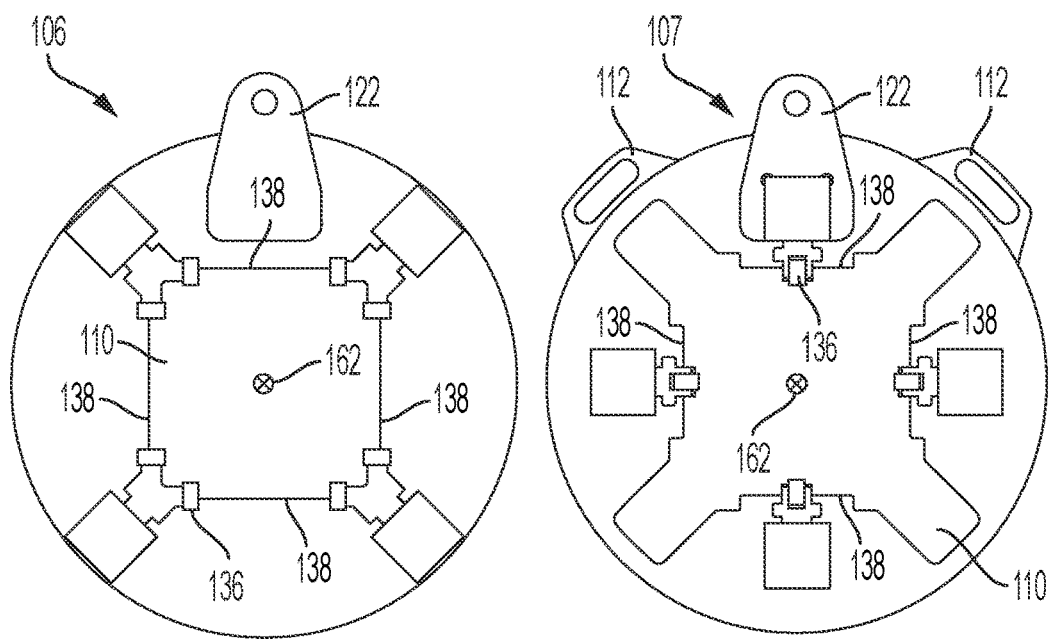
FIG. 6 is an axial view of the front and rear end plates of the weld fixture of FIG. 2.

FIG. 6 is an axial view of both end plates 106, 107. Each end plate has a central aperture 110. A center point of each central aperture may coincide with and/or may define central axis 162 of weld fixture 100. Central apertures 110 are shaped to receive the column. In some examples, the central apertures may be sized to receive a range of sizes and/or styles of elongate members. In the present example, each central aperture is generally rectangular, and formed by four internal edge portions 138. Rollers 136 are mounted along internal edge portions 138 to allow weld fixture 100 to translate along the column.

Each plate includes a lifting point 122, for use with machinery and/or other lifting aids. Lifting points 122 may be used to position weld fixture 100 on the column and/or translate the weld fixture along the column. For example, a crane may be connected to lifting points 122 to lift the weld fixture into position adjacent one end of the column. The frame of the welding fixture may also include one or more handles for manual manipulation of the weld fixture. For example, the weld fixture may be manually translated along the column and/or the weld fixture may be used to help guide a rotation of the column. In the present example, two handles 112 are included on end plate 107 to allow access from either side of the column.

End plate 106 may be referred to as a front, leading, or downstream end plate. Central aperture 110 of front end plate 106 is shaped to receive the column, and in the depicted example is generally square to receive a four-sided box column. Rollers 136 are mounted on front end plate 106 in pairs, with each pair arranged to straddle a corner of the column and contact two adjacent faces of the column proximate the corner.

End plate 107 may be referred to as a back, following, or upstream end plate. Central aperture 110 of back end plate 107 is shaped to receive the column and loaded and/or attached CCAs. In the depicted example, central aperture 110 may be described cross-shaped, and/or as square with rectangular extensions from each corner. A roller 136 is mounted at each internal edge portion 138, to contact a face of the column proximate the center of that face.

Rollers 136 may be configured to be raised and lowered relative to central axis 162 of weld fixture 100. The rollers may be adjusted to position the weld fixture 100 relative to the column, and to bring central axis 162 of the weld fixture into alignment with the z-axis of the column. Rollers 136 may be sufficiently adjustable to position weld fixture 100 on a selected range of column sizes. Adjusting the rollers 136 relative to the column may also permit more play in the movement of weld fixture 100, reducing resistance when sliding the weld fixture over and past tack welded CCAs.

Figure 7:
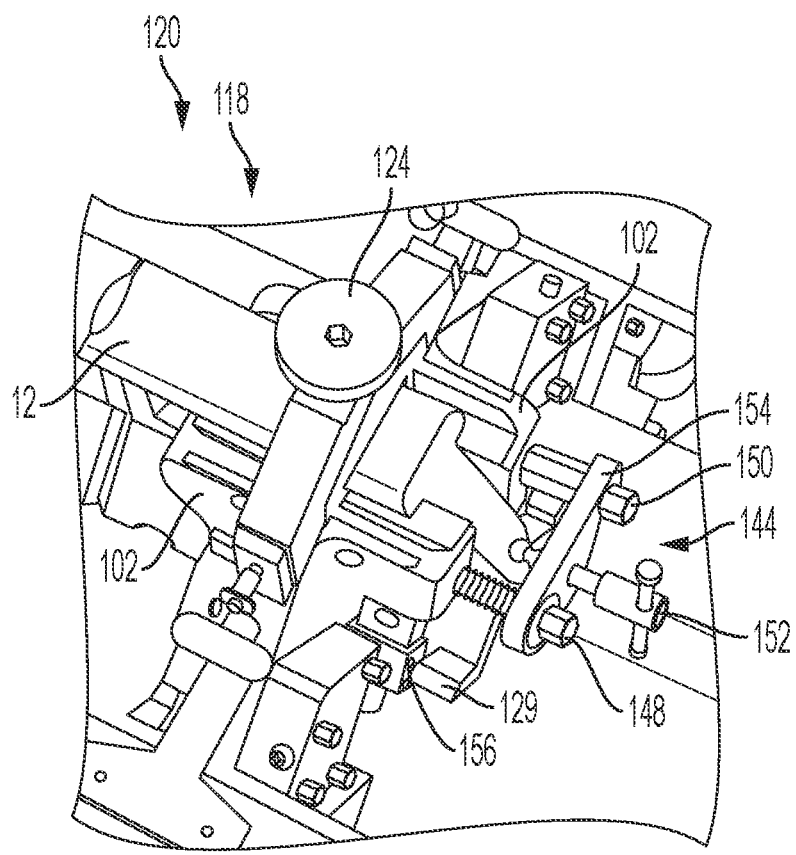
FIG. 7 is an isometric view of a gripping station of the weld fixture of FIG. 2.

FIG. 7 is an isometric view of a gripping station 118 of second simulator assembly 116 and shows a latch device 144 in more detail. Each latch device is fixed at a back or upstream end of a loading station 120, secure a CCA 12 in the loading station at a correct longitudinal position. Latch 144 includes a first bolt 148 fixed to a first flange simulator 102, and a second bolt 150 fixed to a second flange simulator 102. A hook member 154 of the latch pivots about first bolt 148, between an open and a closed position. In the open position, latch 144 may be clear of loading station 120, allowing CCA 12 to be loaded. In the closed position, as shown in FIG. 7, latch 144 extends across loading station 120 with hook 154 engaging second bolt 150. Latch 144 may thereby prevent removal of CCA 12, when in the closed position.

Latch 144 further includes a T-bolt 152 threaded through an aperture in hook member 154. T-bolt 152 is adjustable in and out, along central axis 162, to bear against a bottom end of CCA 12. In the present example, as shown in FIG. 3, the bottom end of each foot 126 CCA 12 includes trailing protrusion 129. The trailing protrusions may be secured against a longitudinal reference surface 156 of each adjacent flange simulator 102 when T-bolt 152 of latch 144 bears against the CCA. Similarly to reference surfaces 131 on the inner surfaces of flange simulators 102, reference surfaces 156 may be precisely located and/or positioned relative to one another, relative to reference surfaces 131, and/or relative to weld fixture 100. Reference surfaces 156 may be machined on flange simulators 102, may be separate components fastened to the flange simulators, and/or may be otherwise precisely manufactured.

The interaction of trailing protrusions 129 and longitudinal reference surfaces 156, as fixed by latch 144, may precisely locate CCA 12 relative to weld fixture 100 along central axis 162. The CCA may be thereby precisely positioned on column 10 along the z-axis of the column.

B. Illustrative Support Assembly

As shown in FIGS. 8-16, this section describes an illustrative support assembly include a rotating clamp 200 and a support stand 400. Rotating clamp 200 is an example of rotating clamp 16, and may also be referred to as a Column Rotating Clamp, or CRC. Support stand 400 is an example of support stand 18, and may also be referred to as a column support stand, or kickstand.

Figure 8:
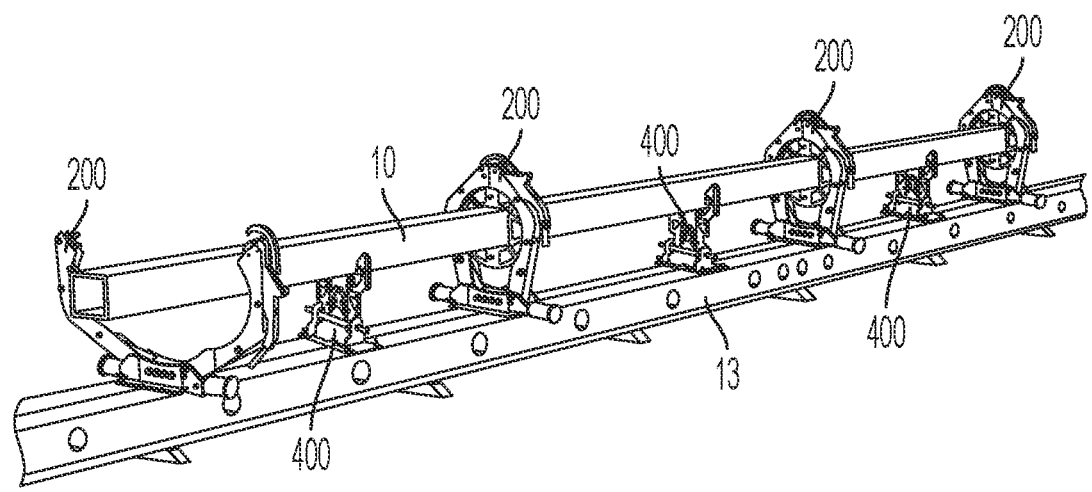
FIG. 8 is an isometric view of an illustrative support assembly.

FIG. 8 shows a column 10 supported by a combination of CRCs 200 and support stands 400 mounted on a track 13. Multiple CRCs and support stands are spaced along the length of the track. Track 13 may be approximately the same length of column 10, or may be longer. At any one time, the column may be supported primarily by the CRCs or primarily by the support stands. Support stands 400 may prevent rotation of the column around an elongate axis, while CRCs 200 may facilitate controlled rotation about the elongate axis.

As shown in FIG. 9A-D, each CRC includes two symmetrical jaws, or arms 210. The arms are pivotably mounted to a support plate, or base 222. The base is in turn mounted to the track. Arms 210 are pivotable between an open position 212, shown in FIGS. 9A-B, and a closed position 214, shown in FIGS. 9C-D. In open position 212, arms 210 are spaced from column 10 sufficiently to allow passage of a weld fixture along the column. In the closed position, the arms define a generally circular opening 216 at top end of CRC 200.

Figure 9A:
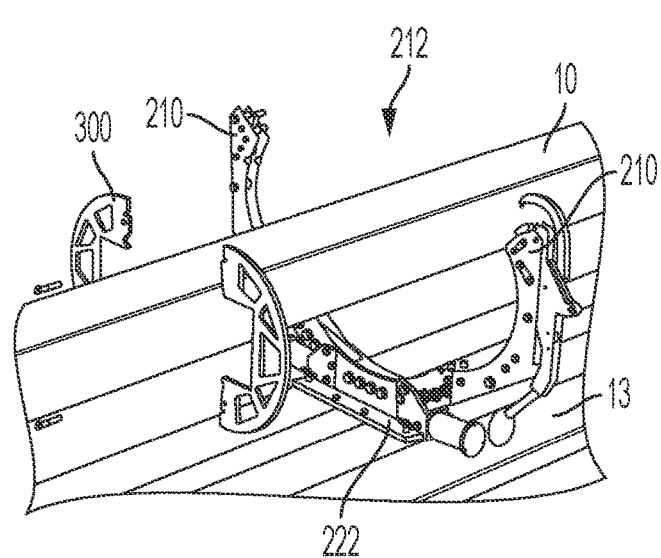
FIG. 9A is an isometric view of a rotating clamp and a rotating ring of the support assembly of FIG. 8 in an open position and an unlocked position, respectively.
Figure 9B:
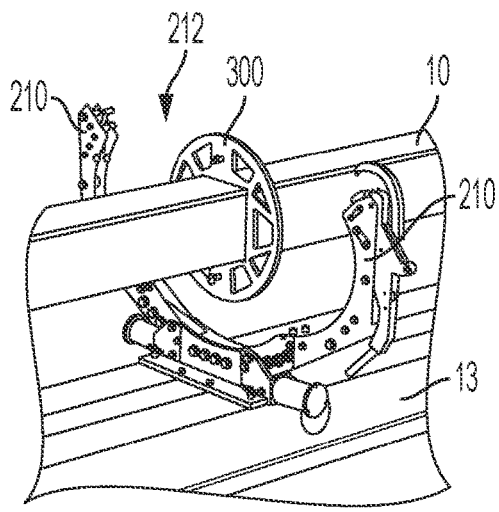
FIG. 9B is an isometric view of the rotating clamp and rotating ring of FIG. 9A in an open and locked position, respectively.
Figure 9C:
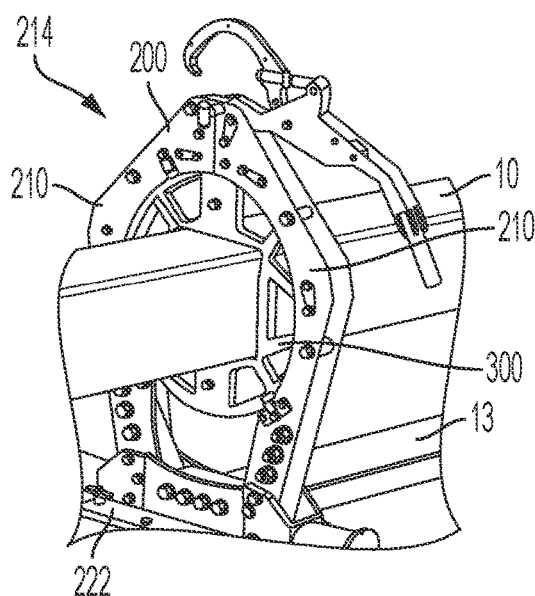
FIG. 9C is an isometric view of the rotating clamp and rotating ring of FIG. 9A in a closed and locked position, respectively.
Figure 9D:
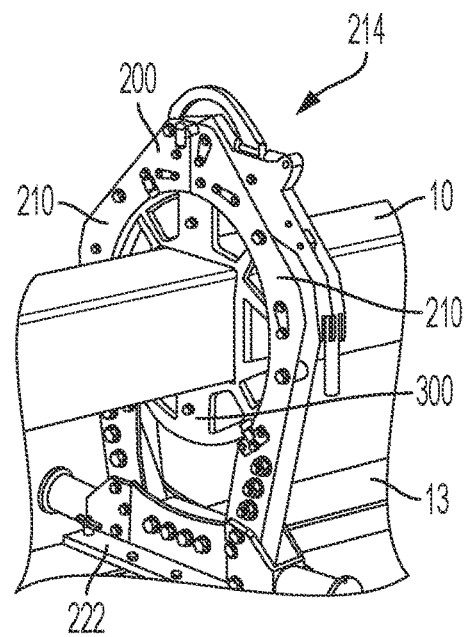
FIG. 9D is an isometric view of the rotating clamp and rotating ring of FIG. 9A, both in locked positions.

Arms 210 are configured to support a Column Rotating Ring (CRR) 300. The ring may be fastened to the column, circumferentially surrounding the column. The ring includes two halves 310, which may each include multiple layers. A half may be positioned on either side of column 10, as shown in FIG. 9A and the two halves joined to form a ring surrounding the column, as shown in FIG. 9B. Upper and lower inside edges of the halves may interlock to form ring 300. Detent pins or other fasteners may be used to secure the two halves together.

Arms 210 may be spring-biased, such that when the arms are opened, descent of each arm is slowed. This may facilitate smooth opening and closing of the arms and allow CRC 200 to be opened without manually supporting the arms, where the weight of the arms might otherwise pose a hazard to workers. Springs may be mounted at a proximal end of each arm and may be mounted in base 222.

Figure 10:
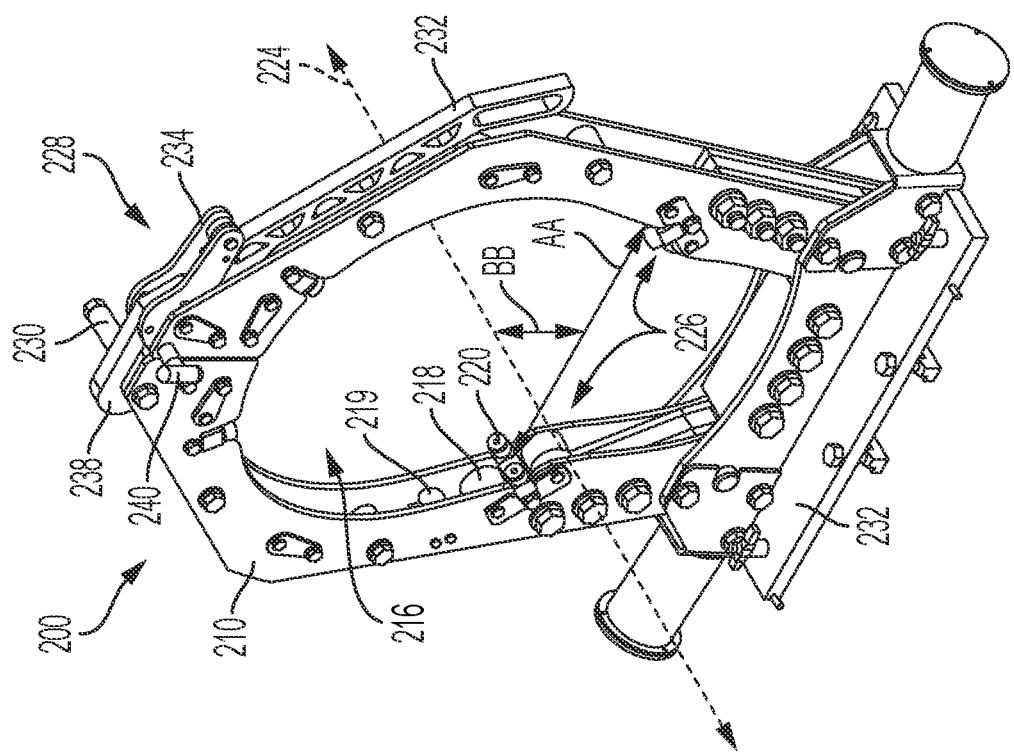
FIG. 10 is an isometric view of the rotating clamp of FIG. 9A.
Figure 12:
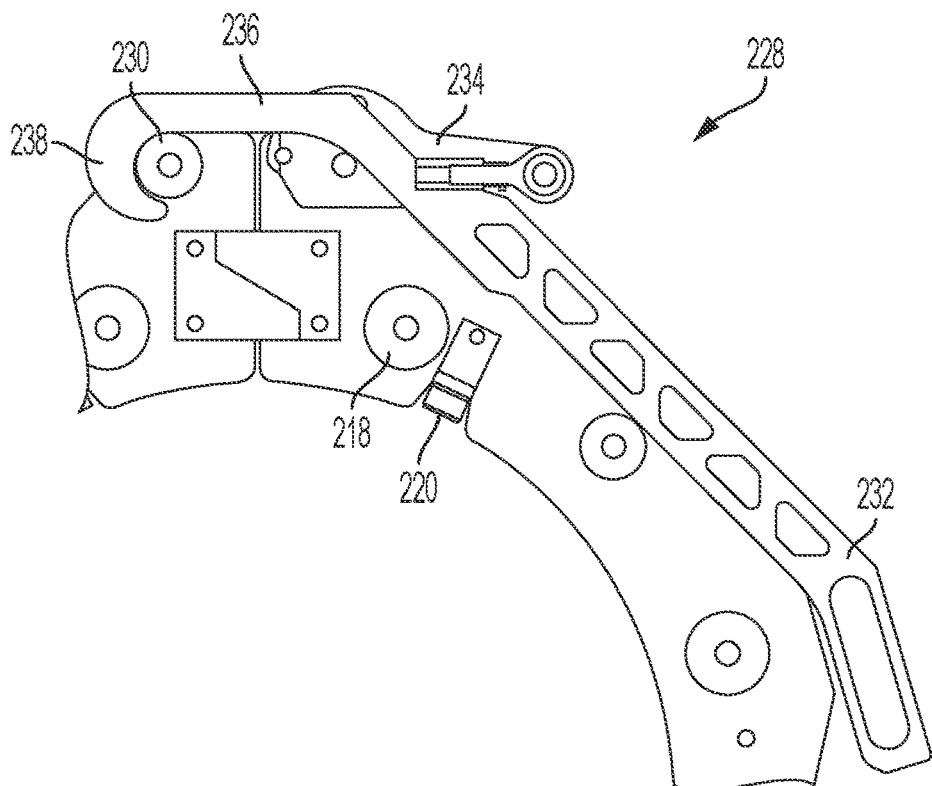
FIG. 12 is a partially cut-away view of the rotating clamp of FIG. 9A

When CRC 200 is in closed position 214, as shown in more detail in FIG. 10, a CRR may be received in circular opening 216. The circular opening may define a central axis 224. Multiple rollers, wheels, or bearings 218 are mounted in each arm 210, to support the ring. In the present example, some bearings 218 are mounted with alignment rollers 220. The ring may rotate within CRC 200, on bearings 218 and maintained in alignment with the CRC by alignment rollers 220. This arrangement may allow smooth rotation, even when supporting the weight of the column.

A pair of bearings 226 is mounted at a lowest point of contact between each arm 210 and the ring. The distance between bearing pairs 226 on the two arms may be referred to as distance AA. As arms 210 pivot from the open to the closed position, distance AA decreases. The vertical distance between roller bearing pairs 226 and central axis 224 may be referred to as distance BB. As arms 210 pivot from the open to the closed position, distance B may also decrease.

As CRC 200 closes, the CRR may come into contact with bearing pairs 226. The ring may rest on bearing pairs 226 as the CRC 200 is closing. The ring and column may be lifted by bearings 226 as distance BB decreases. Bearings 226 may also traverse an outer edge of ring 300, to different positions around the circumference of the ring as distance AA decreases.

Referring again to FIG. 8, column 10 may be supported by support stands 400 when the CRCs 200 are in open position 212, and as the CRCs are being closed. Once one or more of the CRCs are in closed position 214, column 10 may be thereby lifted clear of support stands 400 and may be supported by the closed CRCs.

Returning to FIG. 10, CRC 200 includes an over-center clamp latch 228, mounted at a distal end of one arm 210. A bar 230 is mounted in a corresponding position on the second arm, and latch 228 may hook onto bar 230. Latch 228 may serve to maintain CRC 200 in closed position 214, and also to provide mechanical advantage in closing the CRC.

In the present example, arms 210 include metal sheets bolted together at a fixed distance, allowing latch 228 and bearings 226 to be disposed interior to the arms, between the metal sheets. Latch 228 is shown in more detail in FIG. 14, in which one of the metal sheet is cut away. Latch 228 includes a lever arm, or handle 232 and a clamp linkage 234. Handle 232 includes an angled section 236 with a distal hook 238. In some examples, angled section 236 and distal hook 238 may instead be included in clamp linkage 234.

Latch 228 may be moveable between a released position, a hooked position, and a locked position. In the released position, there may be no contact between arms 210. In the hooked position, hook 238 may engage with bar 230. In the locked position, handle 232 may be lowered and arms 210 may be clamped together. As latch 228 moves from the hooked position to the locked position, handle 232 undergoes an over-center action. The over center clamp mechanism may thereby provide mechanical advantage to closure of CRC 200, as the ring and column 10 are lifted. The weight of column 10 may be more safely and easily lifted by workers with the assistance of the over center clamp mechanism.

As shown in FIG. 10, latch 228 also includes a pin 240, which extends through an aperture in arm 210 and into clamp linkage 234. When inserted, the pin may thereby fix clamp linkage 234 in position relative to the arm and prevent opening of latch 228. Pin 240 may improve safety of CRC 200 by preventing accidental opening of latch 228. Latch 228 may additionally or alternatively include other locks and/or any effective safety measures.

In the present example, one of arms 210 further includes a grounding structure 219, spaced from the bearings. During welding, the grounding structure may be used to prevent damage to bearings or other parts of CRC 200 by redirecting a flow of welding current.

Figure 11:
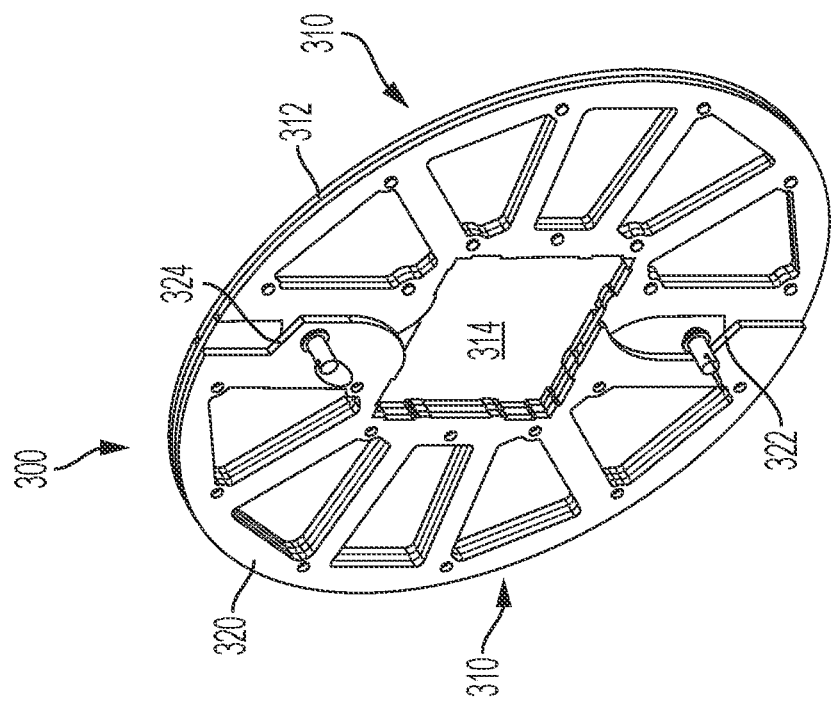
FIG. 11 is a partially cut-away view of the rotating ring of FIG. 9A.

FIG. 11 is a more detailed view of CRR 300. In the present example, each half 310 of CRR 300 includes multiple layers which may be rigid sheets, or plates 320. Each plate has a first inside edge 322 and a second inside edge 324. The first edge has a female geometry and the second edge may has male geometry, such that first edge 322 of a first plate is configured to mate with second edge 324 of a second sheet. All layers may be identical, but the layers may be oriented in opposite directions.

Each half 310 of CRR 300 includes a center plate 320 that is flipped relative to two outer plates. The two halves are matching, but rotated 180 degrees with respect to each other, allowing the male and female geometry of the first and second inside edges 322, 324 to matingly engage. This configuration may simplify manufacturing, allowing all layers to be identically produced and assembled to form an interlocking structure.

CRR 300 is further secured by two detent pins 326 extending through aligned apertures in plates 320. Each detent pin extends through the two outer plates 320 of one half 310 and the center plate 320 of the other half 310. In some examples, each half 310 of CRR 300 may be unity, and may include any effective engaging structures and/or fasteners.

CRR 300 has a circular outer edge 312, of an appropriate diameter to be received by CRC 200. The ring also includes an inner, rectangular aperture 314. Aperture 314 is shaped to receive and closely conform to the column. Aperture 314 has a central axis that coincides with a center defined by circular outer edge 312, and also coincides with the longitudinal axis of the column when ring 300 surrounds the column. Ring 300 may be solid apart from aperture 314 or may have additional apertures to reduce weight while maintaining structural strength.

Figure 13:
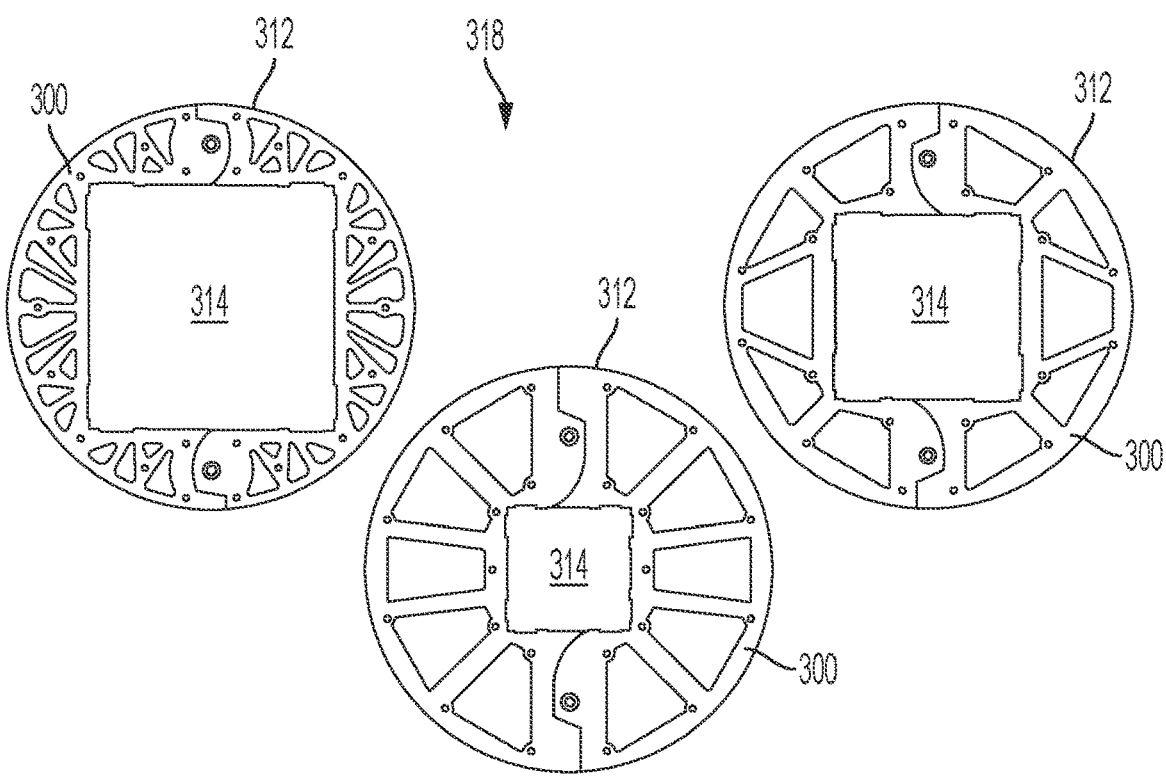
FIG. 13 is an axial view of an illustrative set of rotating rings.

Ring 300 may be included in a set of rings, where each ring is sized to receive a column of different cross-sectional area. FIG. 13 shows an illustrative set of rings 318. Each ring of the set 318 has the same diameter and can be received by the same CRC 200. Switching between rings of the set of rings may allow columns of different sizes to be supported by the same CRC 200. Aperture 314 of each ring has a central axis that coincides with a center defined by circular outer edge 312 and also coincides with the longitudinal axis of a column when the ring surrounds the column. Therefore, a column supported by a ring of set 318 in CRC 200 may be supported with the elongate axis of the column at the same height.

In some examples, Ring 300 may include a central aperture having a non-rectangular shape. For example, the ring may be configured to accept an I-beam or other elongate member. Such rings may allow multiple types of structural members to be supported by the same CRC 200.

Referring again to FIG. 8, support stands 400 may act as a support for column 10 when in an upright position. For example, the column may be lowered onto the support stands when first delivered to a work station. As shown in FIG. 1, support stand 400 can also fold flat against track 13. Support stand 400 may pivot between the upright position and the folded position. The support stand may be moved to the folded position either to allow a weld fixture to pass along column 10, or while the column is undergoing rotation.

Figure 14:
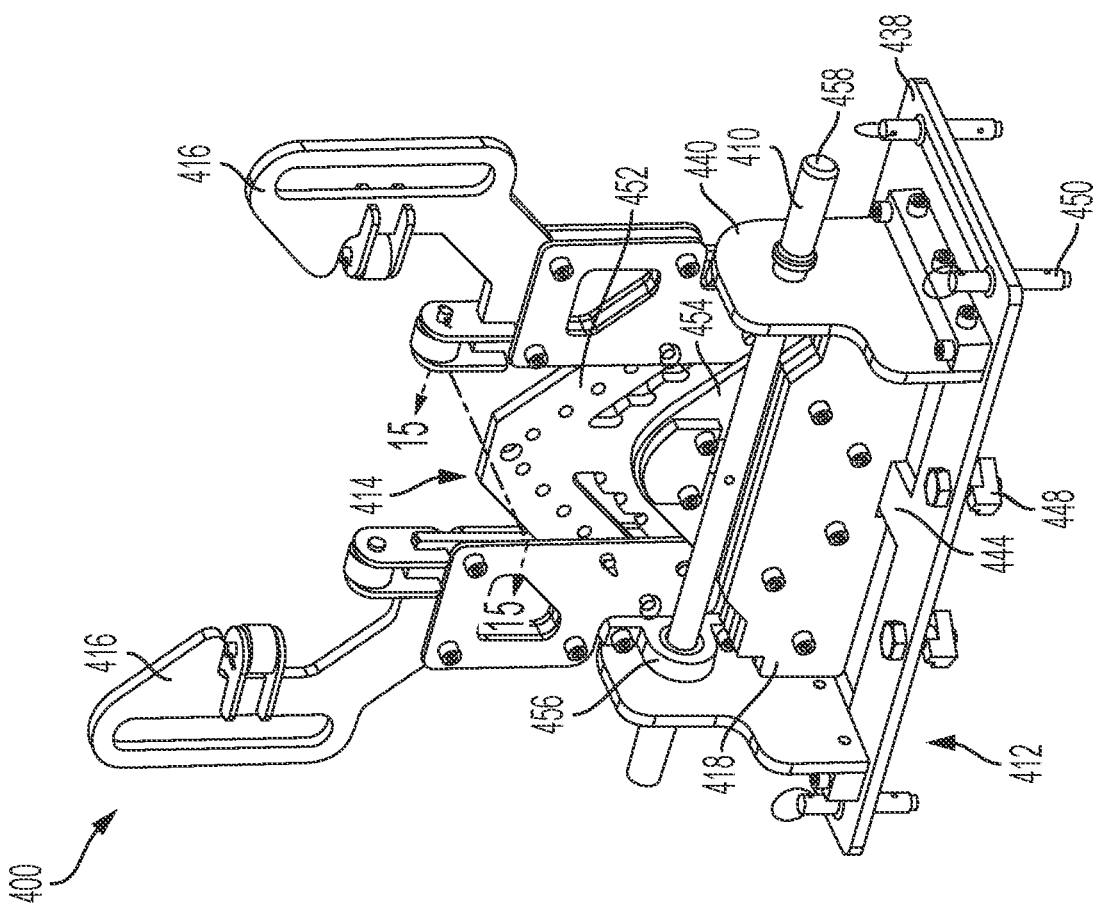
FIG. 14 is an isometric view of a support stand of the support assembly of FIG. 8.

As shown in FIG. 14, support stand includes a base 412 and a main body 414 that is pivotable relative to the base about an axle 410. Two arms 416 are removably and adjustably mounted to the main body, which includes a counterweight 418. In the present example, the main body, base, and arms are all modularly constructed of sheets of metal that are bolted together. This may simplify construction, reduce cost, and allow components to be swapped out for replacement or upgrade.

Main body 414 includes a back plate 452, a housing plate 454, and counterweight 418. An axle guide 456 with a central aperture sized to receive axle 410 is bolted at each lateral edge of back plate 452. The axle extends through and is mounted to main body 414 by the axle guides. At each end of axle 410, distal of the corresponding axle guide, a handle or grip 458 is mounted. Grips 458 may allow manual manipulation of axle 410 from either side of the column support stand. In addition to facilitating the pivot action of the column support stand, axle 410 may act as actuator for a latch mechanism, as described further below.

Counterweight 418 comprises multiple sheets of metal bolted to housing plate 454 and back plate 452 and may be configured to balance the weight of attached arms, such that the pivot action of the column support stand is smooth and requires little application of force. The counterweight is disposed on a lower end of main body 414, below axle 410. Back plate 452 extends past housing plate 454 and counterweight 418 to form an upper end of main body 414.

Base 412 includes a baseplate 438 and two vertical side supports 440. Each side support includes an aperture sized to receive axle 410, main body 414 being thereby supported on the base. The baseplate includes a rectangular opening, divided by a central bar 444. At a bottom edge of the lower end, counterweight 418, housing plate 454, and back plate 452 of main body 414 each include a rectangular recess, forming a channel configured to receive central bar 444 of baseplate 438. A slot in the central bar is configured to engage a latch mechanism, as discussed further below.

Base 412 also includes fasteners to engage the track. In the present example, these include two pairs of bolts 448 with T-slot adaptors and two pairs of detent pins 450. The bolted T-slot adaptors may be installed in longitudinal T-slots of the track to retain baseplate 438 against the track, while allowing the location of the column support stand to be adjusted by sliding along the length of the track. Detent pins 450 may be inserted through baseplate 438 into a subset of a plurality of holes along the track to secure the column support stand in place.

Figure 15:
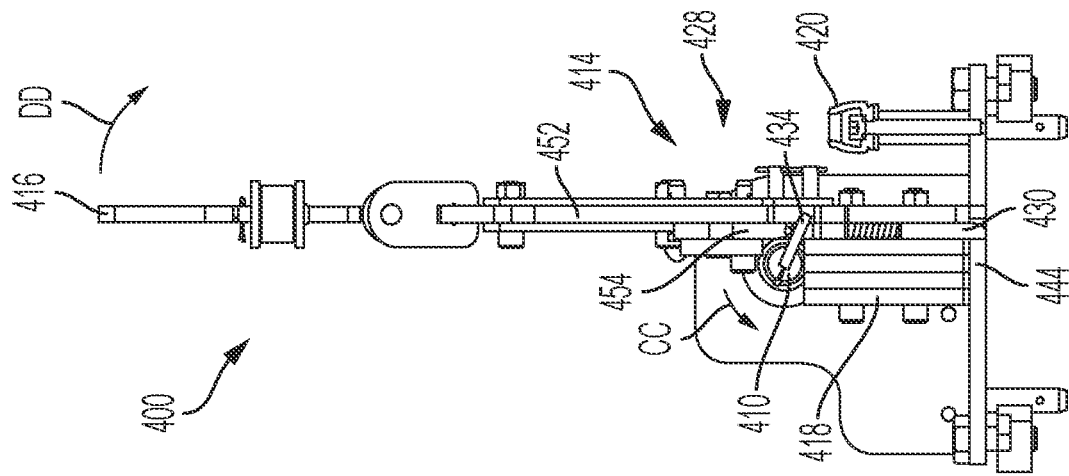
FIG. 15 is a cross-sectional view of the support stand of FIG. 14, along line 15-15.

As shown in FIG. 15, base 412 includes a bumper 420, extending up from baseplate 438 at a rear side of the base. In the folded position, the main body extends generally parallel to baseplate 438, supported between the axle and bumper 420. The bumper is of an appropriate height to contact the main body at approximately a right angle, and may include rubber or a shock-absorbent material to prevent damage to the main body when pivoting to the folded position. The bumper may also prevent the main body and attached arms from pivoting far enough to contact the track.

Support stand 400 further includes a safety latch mechanism 428, shown in cross-section in FIG. 15. The latch mechanism includes a latch bar 430, which extends through a channel in housing plate 454. Latch bar 430 has an open position, not shown, and a locked position, shown in FIG. 15. In the open position, the bar is fully received in the channel of housing plate 454. In the locked position, latch bar 430 extends into a slot in central bar 444 of base 412 and thereby prevents pivoting of main body 414. The latch may only lock when column support stand 400 is in the upright position. Latch bar 430 may also extend when the column support stand is in the folded position, but may not prevent pivoting of the column support stand.

Latch bar 430 is actuated by a pin 434 mounted on axle 410. The pin extends at an angle into an aperture in bar 430. As axle 410 is rotated, the angle of the pin is altered and a distal end of pin 434 is raised or lowered. Pin 434 engages a rounded top end of the aperture in latch bar 430, lifting the latch bar as the distal end of the pin is raised. Rotation of axle 410 thereby lifts latch bar 430 out of the recess in base 412. The rounding of the aperture may help axle 410 to rotate smoothly despite a changing angle of engagement between pin 434 and top end of the aperture, as latch bar 430 is lifted.

Rotation of axle 410 is restricted by contact between latch bar 430 and a top end of the channel in housing plate 454, and contact of pin 434 with a bottom end of the aperture in latch bar 430. Effectively, axle 410 is restricted to rotation between the open position of latch bar 430 and the locked position of latch bar 430. Latch bar 430 is also spring biased, to extend or return to the locked position. A stud mounted in back plate 452 extends into an aperture of latch bar 430, which contains a spring. As the latch bar is lifted, the stud compresses the spring, which urges the latch bar back down and in turn urges rotation of axle 410. To maintain the latch bar in the open position, a user must hold axle 410 in the rotated position against the spring force.

Latch bar 430 is planar on a front side, and rounded at a rear side, providing an automatic latch. Support stand 400 is shown in the upright position, with latch bar 430 in the locked position. To fold the column support stand, a user may rotate axle 410 in a first direction as indicated by arrow CC to unlock the safety latch. The user may then use the handle of an arm 416 to rotate main body 414 in the opposite direction as indicated by arrow DD. Latch mechanism 428 may prevent rotation of the main body in the first direction.

In the folded position, once axle 410 is released, latch bar 430 may be extended by spring bias. To return the column support stand to the upright position, a user may use the handle of an arm 416 to rotate the main body in the first direction. The rounded end of latch bar 430 may contact bar 444 of baseplate 438 and urge the latch bar up into the channel in housing plate 454, until reaching slot 446. Latch bar 430 may then drop down into slot 446, returning to the locked position. This may automatically lock the column support stand into the upright position, eliminating need for the latch to be manually applied.

Figure 16:
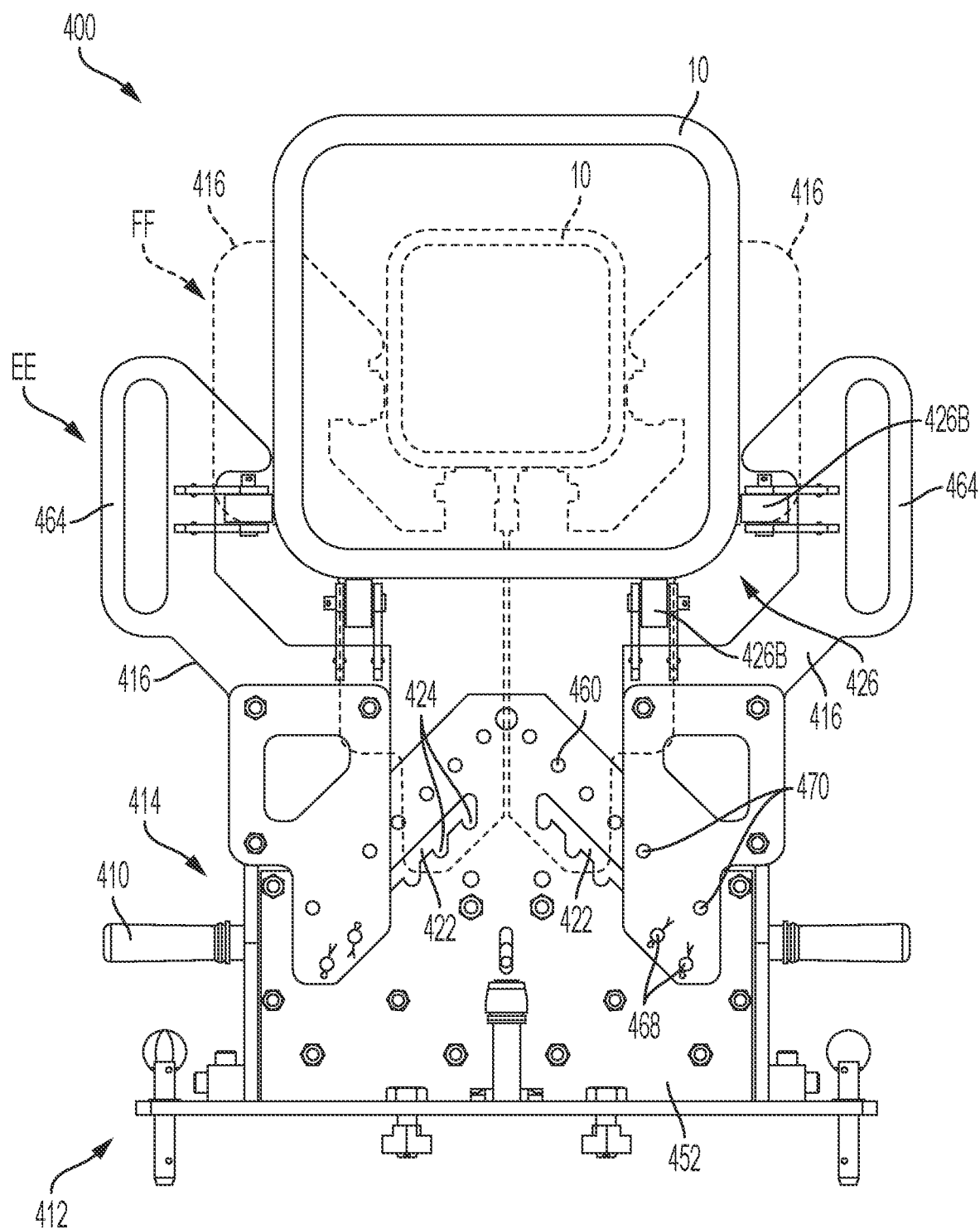
FIG. 16 is an axial view of the support stand of FIG. 14, configured to support first and second illustrative elongate members.

As shown in FIG. 16, each arm 416 of support stand 400 includes a pair of rollers 426. Each pair of rollers includes a support roller 426A rotating about a horizontal axis and a guide roller 426B rotating about a vertical axis. These rotational axes may be described as horizontal and vertical axes of arm 416. Pair of rollers 426 is configured to support and guide a corner of a column, such that between two arms the column is supported and allowed movement only along an elongate axis.

A handle is mounted at an outer lateral edge of each arm, proximate a top end of the arm. The handle is configured to allow manual pivoting of main body 414 between upright and folded positions. As each arm includes a handle at an outer edge, a user may easily access a handle to pivot main body 414 from either side of the column support stand. When mounted on a track and cooperatively supporting a column, access from both sides of the column support stand may be highly advantageous, as reaching under or over the column may be difficult or dangerous and walking around the full length of the track and column may take a prohibitively long time.

At a bottom end of the arm, two metal plates form a channel appropriate to receive back plate 452 of main body 414. Two clevis pins 468 are inserted through apertures at a distal edge of the bottom end of the arm, extending perpendicular to the horizontal and vertical axes of the arm, through the channel and back plate 452. Clevis pins 468 may define a line at approximately a 45 degree angle to both the horizontal and vertical axes of the arm. Two detent pins 470 are inserted through apertures vertically spaced above clevis pins 468, to extend parallel to the clevis pins, through the channel of the arm. Detent pins 470 may also define a line at approximately a 45 degree angle to both the horizontal and vertical axes of the arm. Clevis pins 468 and detent pins 470 are configured to engage back plate 452 to secure each arm 416 to main body 414. In other examples, any number or pattern of fasteners appropriate for connection to main body 414 may be included in each arm 416.

At the upper end, back plate 452 includes two angled elongate slots 422 and a plurality of circular apertures 460. Slots 422 extend at approximately a 45 degree angle relative to axle 410, and orthogonal to one another. Along a lower edge of each slot 422, a plurality of semi-circular recesses 424 are formed. The lower edge of each slot 422 may also be described as saw-toothed. Circular apertures 460 form two lines, parallel to slots 422 and vertically spaced from the slots. These slots, recesses, and apertures are configured for connection of arms 416. In some examples, any number or pattern of apertures appropriate for connection of arms 416 may be included in back plate 452, or main body 414.

Each arm 416 engages a slot 422 and a line of circular apertures 460 of back plate 452. To secure an arm in place, clevis pins 468 rest in two adjacent recesses 424 and detent pins 470 extend through two circular apertures 460. To adjust the arm, the detent pins may be pulled out and the arm lifted by handle 464 until clevis pins 468 clear recesses 424 and extend through an upper channel of slot 422. The arm may be adjusted along the angled upper channel of slot 422 to another position, and the arm lowered until clevis pins 468 rest in another pair of adjacent recesses 424. Detent pins 470 may then be inserted through corresponding circular apertures 460. The other arm may be adjusted to a matching position. Use of detent pins or similar fasteners may allow quick and easy adjustment of arms 416, without need of tools.

FIG. 16 shows arms 416 in a lowest position EE and a highest position FF. In the depicted example, the arms are securable in a further three positions. Each position corresponds to a column size, with the horizontal spacing between guide rollers 426B defining the size. Lowest position EE corresponds to a largest column size, while highest position FF corresponds to a smallest column size. As a result of the 45 degree angles of slots 422 and other engaging components, rollers 426 are located in every arm position such that the central elongate axis of a supported square cross-sectioned column will be at the same spatial location relative to column support stand 400, regardless of the size of the column.

In other words, column support stand 400 may support a range of column sizes such that the elongate axis of the column is the same for each size. This may allow flexibility in welding of CCAs to columns, facilitating use of the same support structures for a range of columns. Height of column support stands and/or column rotating clamps may not need to be adjusted for a change of column size.

C. Illustrative Method of Connecting a Collar Component to an Column

Figure 17:
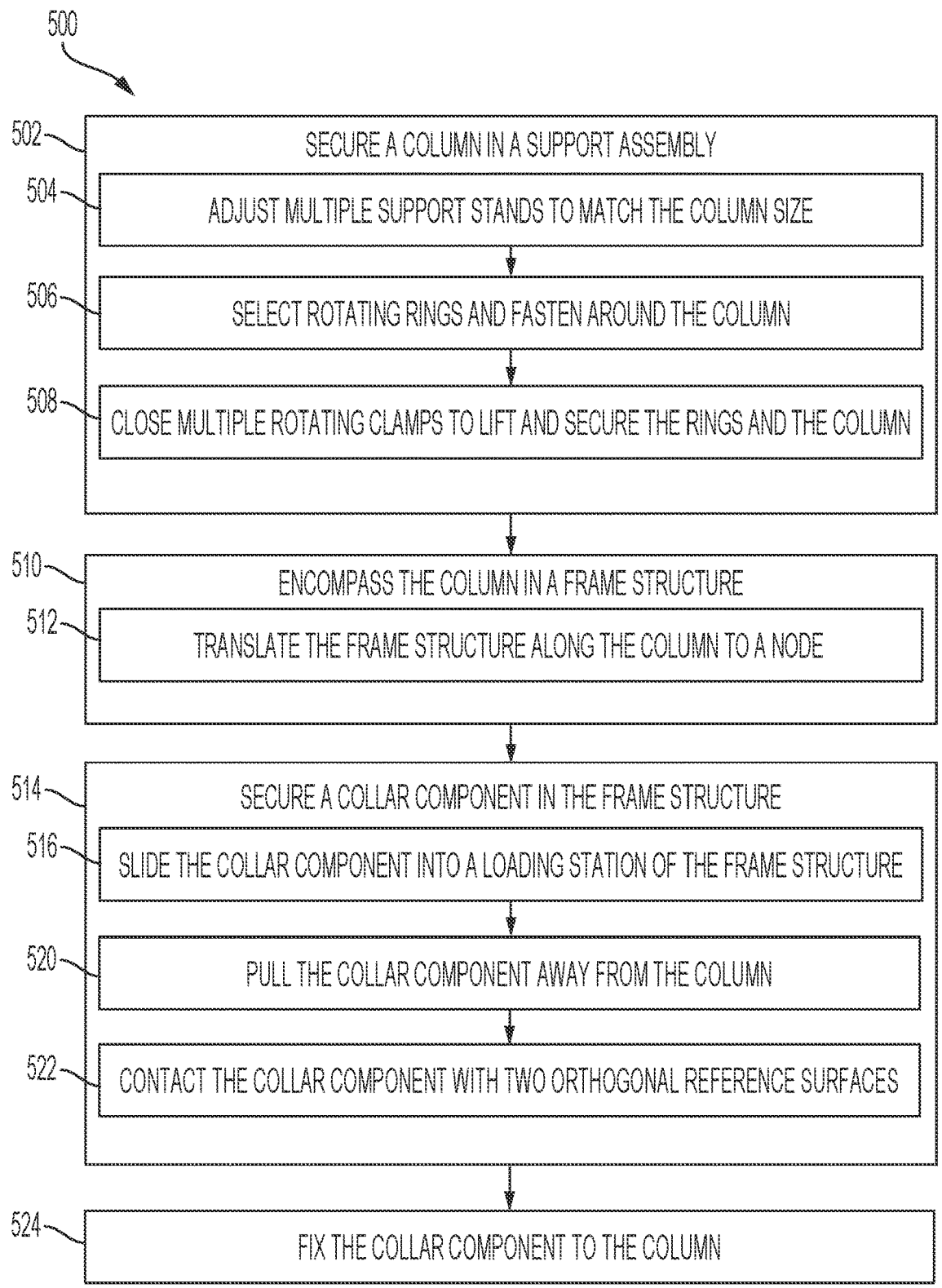
FIG. 17 is a flow chart depicting steps of an illustrative method for connecting a collar component to an elongate member, according to the present teachings.

This section describes steps of an illustrative method for connecting a collar component to a column; see FIG. 17. Aspects of weld fixtures, rotating clamps, and support stands described above may be utilized in the method steps described below. Where appropriate, reference may be made to components and systems that may be used in carrying out each step. These references are for illustration and are not intended to limit the possible ways of carrying out any particular step of the method.

FIG. 17 is a flowchart illustrating steps performed in an illustrative method and may not recite the complete process or all steps of the method. Although various steps of method 500 are described below and depicted in FIG. 17, the steps need not necessarily all be performed, and in some cases may be performed simultaneously or in a different order than the order shown.

At step 502, the method includes securing a column in a support assembly. The column may be a square box column, or in some examples may be any elongate structural member such as an I-beam or a C-channel. The support assembly may include multiple rotating clamps and support stands, mounted alternatingly along the length of a ground support track. The clamps and stands may each be selectively secured to the track and may be adjustable along the track. The clamps and stands may also be adjustable according to a cross-sectional size of the column. To effectively secure the column in the support assembly, the support assembly may be prepared by adjusting the clamps and stands as appropriate to the selected column.

Each support stand may include a base, a main body, and two arms, the two arms being selectably positionable at a plurality of positions on the main body. The main body of the support stand may be pivotable between an upright and a folded position. The base may include detent pins and/or T-bars appropriate to engage one or more channels in the ground support track. Adjusting each stand may include sliding the base along the track to a desired position and securing the base to the track at the desired position.

Sub-step 504 includes adjusting each stand to match the column size. The stand may be adjusted by selecting a pair of corresponding positions of the plurality of positions on the main body and securing each arm to one of the pair of corresponding positions. The arms may be thereby spaced to conform to the selected column Each clamp may include two arms, configured to rotatably support a circular disc or ring. The arms may be pivotably mounted to a base and may pivot between open and closed positions. The base may include detent pins and/or T-bars appropriate to engage one or more channels in the ground support track. Adjusting each clamp may include sliding the base along the track to a desired position and securing the base to the track at the desired position.

The support assembly may be further prepared by placing each clamp in the open position, and each stand in the upright position. The column may be lowered onto the multiple upright support stands, extending parallel to the ground support track. Lifting equipment used to transport the column may be released or removed, allowing the support stands to support the full weight of the column.

Sub-step 506 includes adjusting each clamp by selecting a ring from a set of rings, the ring having a standard outer diameter and an inner aperture configured to conform to the selected column. The sub-step further includes fastening the selected rings around the column. Each ring may be separable into two or more portions. Fastening the ring around the column may include separating the ring into portions, positioning the portions around the column, and fastening the ring together. Each ring may be fastened around the column immediately above the corresponding clamp.

Sub-step 508 includes closing the multiple rotating clamps to lift and secure the rings and the column. Each clamp may be closed, such that the clamp engages the corresponding ring and lifts the column clear of adjacent support stands. The clamp may include mechanical bias features to assist in lifting of the column. For example, the clamp may include an over-center latch mechanism. The latch mechanism may engage partway through closing of the clamp, while the column is still supported by adjacent support stands, and leverage from the over-center action of the latch may provide mechanical advantage in closing the clamp and lifting the column off of the support stands. Once the column is clear of the support stands, the support stands may be placed in the folded position.

At step 510, the method includes encompassing the column in a frame structure. The frame structure may be selected to correspond to the column size. The frame structure may include a plurality of loading stations, each having a reference surface and a clamp device configured to pull a collar component against the reference surface. The loading stations may also be referred to as gripping stations and/or holding stations. The frame device and/or the loading stations may be adjustable for multiple sizes of collar components. For example, the plurality of loading stations may be formed in part by a first and a second simulator assembly. One or both of the simulator assemblies may be adjustable along a central axis of the frame structure. Adjusting the frame structure for a selected collar component size may include securing a simulator assembly at a corresponding position along the frame structure.

The method may include lifting the frame structure by one or more lifting points and positioning the frame structure adjacent a first end of the column. The frame structure may have a front end and a back end and may be positioned with the front end proximate the column. One or more of the support stands of the support assembly may be placed in the upright position, and a rotating clamp closes the first end of the column may be opened. The first end of the column may be received into the frame structure, and the frame structure may be translated along the column, past the open clamp.

Substep 512 includes translating the frame structure along the column to a node. That is, the frame structure may be translated along the column to a position where a collar beam mount is to be constructed. The frame structure may include rollers configured to contact faces of the column, and thereby facilitate translation of the frame structure. The frame structure may further include handles, to allow manual translation of the frame structure. To precisely locate the frame structure at the node, an indexing pin of the frame structure may be extended into an aperture of the column. Once the frame structure is correctly positioned on the column, all open clamps may be closed, and all upright support stands may be returned to the folded position.

Step 514 of the method includes securing a collar component in the frame structure. The step may be repeated for multiple collar components, before proceeding to step 524. For example, four collar components may be secured in the frame structure. Between repetitions of step 514, the column and encompassing frame structure may be rotated to allow easy access to each loading station of the frame structure.

Substep 516 includes sliding the collar component into a loading station of the frame structure. The collar component may be placed and/or positioned on the column proximate the frame structure, then translated along the column into the loading station. Substep 520 of the method includes pulling the collar component away from the column. The clamp device of the loading station may be used to pull the collar component out of contact with the column and into contact with the frame structure. The clamp device may be manually operable, without the use of tools.

Substep 522 includes contacting the collar component with two orthogonal reference surfaces of the loading station, which may be referred to as a first and second reference surface. Each reference surface may be approximately parallel to a face of the column and may be precisely manufactured and/or assembled. The collar component may include two feet, each foot configured for tack welding to a face of the column. The feet may be mutually orthogonal, and each foot may contact one of the orthogonal reference surfaces. When multiple collar components are secured in the frame structure, the collar components may be precisely positioned relative to one another by the reference surfaces.

In some examples, step 514 may further include closing a latch mechanism. The latch mechanism may be disposed at a rear end of the loading station and may prevent removal of the collar component from the loading station. The latch mechanism may further include an adjustable element configured to bear against the collar component and contact the collar component against a third reference surface. The third reference surface may be generally perpendicular to the length of the column, and to the first and second reference surfaces.

Step 524 of the method includes fixing the collar component to the column. In some examples, the step may include fixing all collar components secured in the frame structure to the column. Fixing may include tack welding, bonding, or otherwise connecting the collar component to the column. The column and encompassing frame structure may be rotated during the fixing step, to provide easy access to the collar component. For example, the column may be rotated such that a weld may be performed at a comfortable and/or efficient angle.

In some examples, a column may include more than one node. In such example, once the collar component is fixed to the column, sub-step 512 of the method may be repeated. The frame structure may be translated along the column to another node. Subsequent to fixing one or more collar components at each node of the column, the frame structure may be translated off a second end of the column. The column may be released from the support assembly and transported to storage and/or to a build site for use in construction.

Illustrative Combinations and Additional Examples

This section describes additional aspects and features of apparatus and methods for connecting a collar component to an elongate member, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. An apparatus for connecting collar components to an elongate member, comprising:
  a frame structure having a central opening configured to receive an elongate member, and including at least a first gripping station and a second gripping station, each gripping station including a reference surface and clamp device configured to force a collar component against the reference surface, the first and second gripping stations being configured to control relative spatial location of a first collar component held by the first gripping station relative to a second collar component gripped by the second gripping station, prior to connecting the first and second collar components to the elongate member.

A1. The apparatus of A, wherein the central opening has a central axis, the clamp device of each gripping station being configured to pull a component away from the central axis.

A2. The apparatus of either A or A1, wherein the clamp device of each clamping station is configured to pull a component along a radial axis intersecting the central axis and a corner of a column.

A3. The apparatus of any of A-A2, further comprising:
  a third gripping station and a fourth gripping station, the first, second, third, and fourth gripping stations being configured to hold four collar corner components in position for welding attachment to four corners of a rectangular column.

A4. The apparatus of A3, wherein the gripping stations establish desired pre-set relative positioning between the collar corner components irrespective of variances in the column's shape or position within the positioning device.

A5. The apparatus of either A3 or A4, further comprising:
  four flange simulators, each flange simulator being positioned between an adjacent pair of the first, second, third, and fourth gripping stations.

A6. The apparatus of any of A3-A5, wherein each gripping station has a first and second reference surfaces, the first reference surface being perpendicular to the second reference surface.

A7. The apparatus of any of A-A6, wherein the frame structure includes first and second plate structures, connected in parallel by a plurality of struts, wherein the central opening passes through the plate structures.

A8. The apparatus of any of A-A7, wherein the clamp device is configured to engage a collar component having a proximal Y-portion and a distal T-portion, the clamp device being configured to grip the T-portion of the collar component.

A9. The apparatus of A1, wherein the first and second gripping stations form a loading station configured to receive a collar component by sliding the collar component into the loading station along the central axis.

A10. The apparatus of A9, wherein the loading station includes a longitudinal reference surface configured to contact a trailing protrusion on a collar component to set a precise location of the collar component in the loading station.

A11. The apparatus of A10, wherein the loading station includes a gate having an open position for permitting insertion of a collar component into the loading station, and a closed position for locking the collar component in the loading station with the longitudinal reference surface contacting the trailing protrusion of the collar component.

A12. The apparatus of any of A-A11, wherein one of the gripping stations remains fixed, the other clamp mechanism being adjustable along a Z-axis for processing differing sizes of collar components configured for mating to corresponding differing beam sizes.

A13. The apparatus of any of A-A12, further comprising a referencing pin configured to engage a hole in a column for setting and locking a desired longitudinal location of the frame structure relative to the column.

B. An apparatus for connecting collar components to an elongate member, comprising:
  a reference frame including first and second plate structures connected in parallel by a plurality of struts, each plate structure having an opening for receiving a column,
  a plurality of holding stations, each holding station being mounted between a pair of the plurality of struts, and including a reference surface and a clamp device configured to pull a collar component against the reference surface into a pre-set location relative to other collar components secured at others of the plurality of holding stations.

B1. The apparatus of B, wherein at least four holding stations are mounted between the struts corresponding to four corners of a rectangular column.

B2. The apparatus of either B or B1, wherein at least eight holding stations are mounted between the struts corresponding to four corners of a rectangular column.

B3. The apparatus of any of B-B2, wherein at least four pairs of holding stations are mounted between the struts, each pair of holding stations corresponding to a different corner of a rectangular column.

B4. The apparatus of any of B-B3, wherein the opening of each plate structure is rectangular and formed by four internal edge portions, wherein rollers are mounted along the internal edge portions to allow the reference frame to translate along a column.

B5. The apparatus of any of B-B4, wherein the reference frame has a central axis passing through the centers of the openings in the plate structures, each clamp device being configured to pull a collar component in a direction directly opposite from the central axis.

C. A method of connecting a collar component to an elongate member, comprising:
  securing an elongate member in a support assembly configured to allow rotation of the elongate member around a central axis,
  encompassing the elongate member with a frame structure, the frame structure including a plurality of holding stations, each holding station having a reference surface and a clamp device configured to force a collar component against the reference surface prior to connecting the collar component to the elongate member.

C1. The method of C, wherein the gripping stations are configured to control relative spatial location of four of the collar components around the elongate member.

C2. The method of either C or C1, further comprising:
pulling one or more collar components in an opposite and perpendicular direction relative to the central axis.

C3. The method of C2, wherein the pulling step includes:
contacting a collar component with at least two orthogonal reference surfaces at one of the holding stations.

C4. The method of C3, further comprising:
welding the collar component to the elongate member after the contacting step.

D. A system for welding a member to a column, comprising:
an apparatus configured to support a box column, and to permit rotation of the column around a core longitudinal axis of the column, and
a cage structure configured for sliding along the column and precisely supporting and locating a collar corner member relative to a corner of a column.

E. A method of positioning a collar corner member relative to a corner of a rectangular column, comprising:
sliding a cage structure longitudinally along a rectangular column, the cage structure including at least one weld station, and at least one datum surface,
loading a collar corner member into the weld station, and clamping the collar corner member against the datum surface.

E1. The method of E, wherein the collar corner member includes a Y-portion and a T-portion, the clamping step including gripping the T-portion of the collar corner member.

E2. The method of E, wherein the cage structure has a rotational axis, the loading step including sliding the collar corner member into the weld station along a Z-axis parallel to the rotational axis.

E3. The method of E2, wherein the loading step includes stopping sliding of the collar corner member when a trailing protrusion on the collar corner member contacts a datum surface in the weld station of the cage structure.

E4. The method of E, further comprising fixing the longitudinal location of the cage structure along the column by engaging an indexing pin with a hole in the column.

E5. The method of E, wherein the clamping step includes actuating at least two clamp devices.

F. An apparatus for supporting a rectangular column, comprising:
a ground support structure,
a base mounted on the ground support structure,
a clamp including first and second jaw members, each jaw member having distal end portions, being pivotally mounted on the base and moveable between open and closed positions, and
a latch device configured to selectively connect the distal end portions of the jaw members in the closed position, at least partially forming a substantially circular enclosure for permitting rotation of a supported beam.

F1. The apparatus of F, wherein the latch device includes a lever arm actuator moveable between released and locked positions, wherein the lever arm transitions through an over-center action as it moves between the released position and the locked position.

F2. The apparatus of F1, further comprising:
a plurality of bearings mounted inside the jaw members configured for supporting a column rotating ring surrounding a rectangular column, wherein the latch device and bearings are configured to lift the column rotating ring a vertical distance as the lever arm moves from the released position to the locked position.

F3. The apparatus of F2, further comprising:
a grounding structure remote from the bearings.

F4. The apparatus of any of F-F3, wherein the latch device has a hooked position intermediate the released position and locked position.

F5. The apparatus of any of F-F4, wherein jaw members are biased to assist with manual opening and closing.

F6. The apparatus of F5, wherein each jaw member is biased by a spring acting on a proximal end portion of the jaw member.

F7. The apparatus of any of F-F6, further comprising:
a first column rotating ring having a circular outer shape and a rectangular inner shape, the jaw members being configured to support and permit rotation of the column rotating ring when the jaw members are in the closed positions.

F8. The apparatus of F7, wherein the column rotating ring is formed by two separable half portions, each half portion including three rigid sheet members, each sheet member having a first end portion and a second end portion, the first end portion having an inner male profile and outer female profile, the second end portion having an inner female profile and an outer male profile.

F9. The apparatus of either F7 or F8, further comprising:
a second column rotating ring having the same outer diameter as the first column rotating ring, and a different inner rectangular dimension compared to the first column rotating ring, the second column rotating ring being interchangeable with the first column rotating ring inside the jaw members of the clamp.

F10. The apparatus of F9, wherein each of the first and second column rotating rings is configured to fit on a rectangular column having a different cross-sectional dimension.

F11. The apparatus of F10, wherein each of the column rotating rings supports a center axis of a column at the same location relative to the clamp.

F12. The apparatus of any of F-F11, wherein the ground support structure has a linear track, the base being moveable along the track.

G. A method of translating a positioning device along a column past a clamp device, comprising:
unlatching upper end portions of first and second pivotal jaw members of a column rotating clamp assembly at a support station,
pivoting the jaw members from a closed position to an open position,
translating a positioning device along a column past the support station,
pivoting the jaw members back to the closed position, and
re-latching upper end portions of the first and second pivotal jaw members together, forming at least a partial circular enclosure around a column rotating ring.

G1. The method of G, further comprising:
erecting a support stand under a column at least partially supported by the clamp, wherein a column contacting surface of support stand is lower than the lowest height of the column when the column is supported by the column rotating clamp, supporting the column by the support stand during the translating step, and lifting the column off of the support stand by closing the jaw members to the closed position.

G2. The method of either G or G1, further comprising: mechanically assisting movement of the jaw members between open and closed positions.

G3. The method of any of G-G2, further comprising: hooking the jaw members together prior to actuating an over-center lever arm.

G4. The method of G3, further comprising: elevating support bearings inside the jaw member by actuating the lever arm.

H. An apparatus for supporting an elongate member, comprising:
a base connected to a guide member, and
first and second support structures moveably connected to the guide member, the support structures being configured to support an elongate member having a central longitudinal axis oriented horizontally above the base by a height X, wherein the support structures are configured to move upward and inward between a plurality of positions, each position being configured to support an elongate member having a different cross-sectional dimension and a central longitudinal axis at height X.

H1. The apparatus of H, wherein the guide member includes a plate portion mounted on an axle allowing the plate portion to rotate between a vertical position and a horizontal position, the plate portion having first and second diagonal tracks, the first support structure being moveable along the first diagonal track and the second support structure being moveable along the second diagonal track.

H2. The apparatus of H1, wherein each support structure has one or more wheels for allowing horizontal translation of an elongate member.

H3. The apparatus of H1 or H2, wherein each support structure has an upper handle portion configured for manual manipulation of the support structure to move the support structure upward and downward along the respective diagonal track.

H4. The apparatus of any of H1-H3, wherein the base includes a handle permitting manual locking of the plate portion in the vertical position, and releasing of the plate portion to freely rotate to the horizontal position.

H5. The apparatus of any of H-H4, wherein each support structure has at least two contact surfaces configured for supporting two sides of a rectangular elongate member.

Advantages, Features, and Benefits

The different embodiments and examples of the apparatus for connecting collar components to an elongate member described herein provide several advantages over known solutions for manufacturing beam mount collars. For example, illustrative embodiments and examples described herein allow precise positioning of collar components relative to each other.

Additionally, and among other benefits, illustrative embodiments and examples described herein allow correct positioning of collar components irrespective of tolerances, deviations, and imperfections in the elongate member.

Additionally, and among other benefits, illustrative embodiments and examples described herein allow a single set of equipment to be adjusted for a range of collar component sizes.

Additionally, and among other benefits, illustrative embodiments and examples described herein allow safe and easy access for workers connecting the collar components to the elongate member.

However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An apparatus for supporting an elongate member, comprising:
a base connected to a guide member,
a first support structure moveably connected to the guide member, and
a second support structure moveably connected to the guide member,
wherein the first and second support structures are configured to support each of a plurality of sizes of the elongate member in a corresponding one of a plurality of discrete positions,
wherein the first and second support structures are configured to move upward and inward between the plurality of discrete positions,
wherein a central longitudinal axis of the elongate member is at the same height for each of the plurality of sizes, when supported in the corresponding position of the plurality of discrete positions, and
wherein the guide member includes:
first and second diagonal tracks, the first support structure being moveable along the first diagonal track and the second support structure being moveable along the second diagonal track, and
a plurality of apertures corresponding to apertures of the first and second support members, and the first and second support structures are securable in a position of the plurality of discrete positions by one or more fasteners extending through the corresponding apertures.

2. The apparatus of claim 1, wherein the guide member includes a plate portion mounted on an axle allowing the plate portion to rotate between a vertical position and a horizontal position, the plate portion having the first and second diagonal tracks.

3. The apparatus of claim 2, wherein each of the first and second support structures has one or more wheels for allowing horizontal translation of an elongate member.

4. The apparatus of claim 2, wherein each of the first and second support structures has an upper handle portion configured for manual manipulation of the support structure to move the support structure upward and downward along the respective diagonal track.

5. The apparatus of claim 2, wherein the base includes a handle permitting manual locking of the plate portion in the vertical position, and releasing of the plate portion to freely rotate to the horizontal position.

6. The apparatus of claim 1, wherein each of the first and second support structures has at least two contact surfaces configured for supporting two sides of a rectangular elongate member.

7. An apparatus for supporting an elongate member, comprising:
- a base,
- a main body pivotably connected to the base by an axle, the main body including a guide member and a pair of support structures, wherein:
- the main body is pivotable between an upright position and a folded position,
- each of the pair of support structures is configured to support one corner of an elongate member when the main body is in the upright position,
- each of the pair of support structures includes a pair of wheels which allow translation of an elongate member supported by the pair of support structures, the wheels of each pair being rotatable around mutually orthogonal axes,
- the pair of support structures is adjustable between a plurality of positions,
- the axle actuates release of a safety latch which locks the main body in the upright position.

8. The apparatus of claim 7, wherein each of the pair of support structure is configured to contact both of two orthogonal surfaces that meet at one corner of a rectangular elongate member.

9. The apparatus of claim 7, wherein the safety latch automatically engages when the main body is returned to the upright position.

10. The apparatus of claim 7, wherein the guide member includes first and second diagonal tracks, a first support structure of the pair of support structures being moveable along the first diagonal track and a second support structure of the pair of support structures being moveable along the second diagonal track.

11. The apparatus of claim 10, wherein the first and second diagonal tracks each include a slot extending at approximately 45 degrees, and each track includes a plurality of recesses at a bottom surface of the slot, the plurality of recesses defining the plurality of positions of the pair of support structures.

12. The apparatus of claim 10, wherein the apparatus is configured to support the elongate member with a central axis of the elongate member at a first height, and each position of the plurality of positions of the pair of support structures is appropriate to support an elongate member of a different cross-sectional size with a central axis at the first height.

13. The apparatus of claim 10, wherein the guide member further includes a plurality of apertures corresponding to apertures of the pair of support members, and the pair of support structures are securable in a position of the plurality of positions by one or more fasteners extending through the corresponding apertures.

14. The apparatus of claim 7, wherein the base and the main body each comprise a plurality of metal plates.

15. The apparatus of claim 7, wherein the main body includes a counterweight, the counterweight being disposed below the axle when the main body is in the upright position.

16. The apparatus of claim 15, wherein each of the pair of support structures includes a handle.

17. The apparatus of claim 16, wherein the handle of each support structure is configured for both (a) adjustment of the support structure between the plurality of positions and (b) pivoting of the main body between the upright position and the folded position.

18. The apparatus of claim 7, wherein the base includes a vertically upwardly extending bumper structure, and the main body contacts the bumper structure in the folded position.

19. An apparatus for supporting an elongate member, comprising:
- a ground support structure including a track,
- an elongate member supported by the apparatus, and
- a stand securable at a plurality of positions along the track, the stand including:
  - a base,
  - a main body pivotably connected to the base by an axle, the main body including a guide member and first and second support structures, wherein the main body is pivotable between an upright position and a folded position,
- wherein the first support structure and the second support structure each contact the elongate member when the main body is in the upright position, and are each spaced from the elongate member when the main body is in the folded position, and
- wherein the main body includes a counterweight, the counterweight being disposed below the axle when the main body is in the upright position.

* * * * *